(12) United States Patent
Huang

(10) Patent No.: US 8,077,249 B2
(45) Date of Patent: Dec. 13, 2011

(54) IMAGING APPARATUS, IMAGING METHOD AND PROGRAM

(75) Inventor: Yenshan Huang, Tokyo (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 12/395,794

(22) Filed: Mar. 2, 2009

(65) Prior Publication Data

US 2009/0244357 A1 Oct. 1, 2009

(30) Foreign Application Priority Data

Mar. 27, 2008 (JP) ................................. 2008-084711

(51) Int. Cl.
*G03B 13/00* (2006.01)

(52) U.S. Cl. ....................................................... 348/345

(58) Field of Classification Search .................... 348/345
See application file for complete search history.

(56) References Cited

U.S. PATENT DOCUMENTS

| | | | |
|---|---|---|---|
| 6,888,567 B2 * | 5/2005 | Watanabe | 348/211.8 |
| 6,919,927 B1 * | 7/2005 | Hyodo | 348/333.02 |
| 7,034,881 B1 | 4/2006 | Hyodo et al. | |
| 7,248,796 B2 * | 7/2007 | Triteyaprasert et al. | 396/147 |
| 7,417,683 B2 * | 8/2008 | Hirai | 348/350 |
| 7,551,223 B2 * | 6/2009 | Tanaka | 348/346 |
| 7,809,260 B2 * | 10/2010 | Kubota et al. | 396/124 |

FOREIGN PATENT DOCUMENTS

| | | |
|---|---|---|
| JP | 11-136568 | 5/1999 |
| JP | 11-355617 | 12/1999 |
| JP | 2007-93967 | 4/2007 |
| JP | 3969304 | 6/2007 |

\* cited by examiner

*Primary Examiner* — Rodney Fuller

(74) *Attorney, Agent, or Firm* — Oblon, Spivak, McClelland, Maier & Neustadt, L.L.P.

(57) ABSTRACT

An imaging apparatus includes an imaging unit to pick up an image of a subject, a focusing unit to perform focusing on the subject included in an autofocus area in an imaging range of the imaging unit, a display unit to display an image obtained by picking up an image of the subject by the imaging unit, a display control unit to control the display unit to display an autofocus frame representing the autofocus area on the image, a position specification reception unit that is disposed to be superimposed on the display unit and receives user's position specification to the image displayed on the display unit, and a record control unit to record the image on a recording medium in a state where focusing is achieved on the subject when the position specification reception unit receives the position specification in the autofocus frame.

16 Claims, 17 Drawing Sheets

IMAGING APPARATUS, IMAGING METHOD AND PROGRAM

CROSS REFERENCES TO RELATED APPLICATIONS

The present invention contains subject matter related to Japanese Patent Application JP 2008-084711 filed in the Japanese Patent Office on Mar. 27, 2008, the entire contents of which being incorporated herein by reference,

BACKGROUND OF THE INVENTION

1. Field of the Invention

The present invention relates to an imaging apparatus, an imaging method and a program.

2. Description of the Related Art

In recent years, in an imaging apparatus such as a digital camera, one including a touch panel is proposed in order to improve the operability of a user. For example, Japanese Patent No. 3969304 (Patent Document 1) discloses a technique in which a touch panel is provided on a digital camera, a user taps the touch panel to specify an arbitrary position in a displayed image as an autofocus area (hereinafter referred to as an AF area), and a photograph can be taken. In the digital camera disclosed in Patent Document 1, a shutter button of the digital camera is depressed, so that a focusing process of a subject is started with reference to the AF area of the specified position, and after the focusing, a picked-up image is compressed and coded and is recorded.

Besides, as other related art relating to a digital camera to take a photograph by using a touch panel, there are the following. For example, JP-A-1999-355617 (Patent Document 2) discloses a digital camera in which different instructions are given according to the intensity of pressing force at the time of touching a touch panel. In the technique of Patent Document 2, when the pressing force at the time of touching is less than a predetermined pressing force, a photographing preparation operation is instructed, and when the pressing force is not lower than the predetermined pressing force, a photographing operation is instructed. Besides, JP-A-2007-93967 (Patent Document 3) discloses a digital camera in which instead of the above pressing force, based on a contact area of a fingertip on a touch panel, the photographing instruction or photographing preparation instruction is determined, and a threshold value for the contact area used at the determination can be registered.

SUMMARY OF THE INVENTION

However, in the operation system of Patent Document 1, in order to record the picked-up image by executing the photographing process, after the AF area is specified by tapping the touch panel, it is necessary to depress the shutter button as in the related art. That is, not only the photographing and recording process, but also the focusing process is not performed only by tapping the touch panel. The focusing process is first performed by half-pressing the shutter button after the tapping, and then, the photographing and recording process is performed by fully pressing the shutter button. When the shutter button is depressed as stated above, it is difficult to stably hold the camera, and there is a case where hand movement occurs. Further, although the AF area can be specified by tapping the touch panel, when the input operation to instruct the photographing is the depression of the shutter button, it is difficult for the user to intuitively recognize that the focusing is performed on the specified AF area and the photographing process is performed.

On the other hand, in the operation system in which the photographing preparation instruction and the photographing instruction are chosen according to the pressing force to the touch panel as in Patent Document 2, the input operation is intuitive. However, since it is determined by the intensity of the pressing force whether the photographing is started or not, the actual operation method is liable to be influenced by differences between users and is unstable. For example, when the pressing force of the shutter button is low, the photographing is not started and the shutter chance is lost. On the contrary, when the pressing force is high, hand movement can occur although the touch panel is used.

Besides, also in the operation system using the contact area to the touch panel as in Patent Document 3, similarly to the operation system using the pressing force, the actual operation method is liable to be influenced by differences between users and is unstable. Further, there are problems that it takes some time to register the threshold value of the contact area, and convenience is lacking when, for example, the digital camera is used among several people.

Thus, it is desirable to provide an imaging apparatus, an imaging method and a program, in which photographing can be stably performed without an operation error due to differences between individuals by a simple operation system in which the user can intuitively grasp the position of an AF area.

According to an embodiment of the present invention, there is provided an imaging apparatus which includes an imaging unit to pick up an image of a subject, a focusing unit to perform focusing on the subject included in an autofocus area in an imaging range of the imaging unit, a display unit to display an image obtained by picking up an image of the subject by the imaging unit, a display control unit to control the display unit to display an autofocus frame representing the autofocus area on the image, a position specification reception unit that is disposed to be superimposed on the display unit and receives user's position specification to the image displayed on the display unit, and a record control unit to record the image on a recording medium in a state where focusing is achieved on the subject included in the autofocus area when the position specification reception unit receives the position specification in the autofocus frame displayed on the display unit.

According to the structure as stated above, the image obtained by picking up an image of the subject by the imaging unit is displayed on the display unit, the autofocus frame representing the autofocus area in the imaging range of the imaging unit is displayed on the image displayed on the display unit, the position specification reception unit disposed to be superimposed on the display unit receives the position specification in the autofocus frame displayed on the display unit, and the image in the state where the focusing is achieved on the subject included in the autofocus area is recorded on the recording medium according to the reception of the position specification.

Besides, the display control unit causes the autofocus frame to be displayed on the image displayed on the display unit according to an input operation of the user to the imaging apparatus, the position specification reception unit receives the user's position specification to the image displayed on the display unit by a user's tap on the position specification reception unit, and when the focusing process on the subject included in the autofocus area by the focusing unit is completed and the position specified by the user's tap on the position specification reception unit is in the autofocus frame displayed on the display unit, the record control unit may record, on the recording medium, the image focused on the subject included in the autofocus area.

Besides, there is further included an autofocus area setting unit to set the autofocus area in the imaging range, the position specification reception unit receives the position specification of the autofocus area in the imaging range by the user's tap on the position specification reception unit, and the autofocus area setting unit may set the autofocus area at a position specified by the user's tap on the position specification reception unit.

Besides, the position specification reception unit receives the position specification of the autofocus area by a first user's tap on the position specification reception unit, the autofocus area setting unit sets the autofocus area at the position specified by the first tap, the display control unit causes the autofocus frame representing the autofocus area set by the autofocus area setting unit to be displayed on the image of the display unit, the position specification reception unit receives the user's position specification to the image displayed on the display unit by a second user's tap on the position specification reception unit, and when the focusing process on the subject included in the autofocus area by the focusing unit is completed and the position specified by the second tap is in the autofocus frame displayed on the display unit, the record control unit may record, on the recording medium, the image focused on the subject included in the autofocus area.

Besides, when the position specified by the second tap is outside the autofocus frame displayed on the display unit, the autofocus area setting unit may move the autofocus area to the position specified by the second tap.

Besides, when the focusing process is not completed and the second tap is received within a time from the first tap, the record control unit may record the image on the recording medium.

Besides, when the focusing process is not completed, the second tap is received within the time from the first tap and the position specified by the second tap is in a first area containing the autofocus frame, the record control unit may record the image on the recording medium.

Besides, when the focusing process is not completed and the second tap is received within the time from the first tap, the autofocus area setting unit sets a second area containing the autofocus area as a new autofocus area, the focusing unit performs the focusing process on the subject included in the second area, and the record control unit may record, on the recording medium, the image focused on the subject included in the second area.

Besides, when the focusing process is not completed and the position specification by the second tap is outside the first area containing the autofocus frame or the second tap is received after the time passes from the first tap, the autofocus area setting unit may move the autofocus area to the position specified by the second tap.

Besides, the focusing unit may start the focusing process on the subject included in the autofocus area according to the first tap.

Besides, the focusing unit may continue the focusing process on the subject included in the autofocus area while the first tap on the position specification reception unit is continued.

Besides, the autofocus area setting unit may return the autofocus area set at the position specified by the user's tap on the position specification reception unit into an initial state according to an input operation of the user to the imaging apparatus.

Besides, the display control unit may control the display unit to superimpose, on the image, at least one of information indicating whether the focusing process on the subject included in the autofocus area by the focusing unit is completed and information indicating an area where the autofocus area can be specified and to display it.

Besides, there is further included an autofocus area setting unit to set the autofocus area in the imaging range, the autofocus area setting unit sets a first area positioned at a center of the imaging range as the autofocus area according to an input operation of the user to the imaging apparatus, the display control unit causes one or two or more autofocus frames included in the autofocus area set by the autofocus area setting unit to be displayed on the image of the display unit, the position specification reception unit receives the user's position specification to the image displayed on the display unit by the user's tap on the position specification reception unit, and when the focusing process on the subject included in the autofocus area by the focusing unit is completed and the position specification reception unit receives the position specification, the record control unit may record, on the recording medium, the image focused on the subject included in the autofocus area.

Besides, there is further included an exposure adjusting unit to perform exposure adjustment on the image while an autoexposure area in the imaging range is made an object, and when the position specified by the user's tap is in the autofocus frame displayed on the display unit, the exposure adjusting unit performs exposure adjustment on the image while a second area including the specified position and narrower than the first area is made the autoexposure area, and when the position specified by the user's tap is outside the autofocus frame displayed on the display unit, the exposure adjusting unit performs exposure adjustment on the image while a third area wider than at least the second area is made the autoexposure area, and the record control unit may record, on the recording medium, the image focused on the subject included in the autofocus area and subjected to the exposure adjustment while the second area or the third area is made the object.

Besides, there is further included an exposure adjusting unit to perform exposure adjustment on the image while an autoexposure area in the imaging range is made an object, and when the focusing process is not completed and the user's tap on the position specification reception unit continues for a time or more, the focusing unit performs focusing on the subject included in a fourth area which includes the position specified by the user's tap and is narrower than the first area, the exposure adjusting unit performs exposure adjustment on the image while the fourth area is made an object, and the record control unit may record, on the recording medium, the image focused on the subject included in the fourth area and subjected to the exposure adjustment while the fourth area is made the object.

Besides, there is further included an exposure adjusting unit to perform exposure adjustment on the image while an autoexposure area in the imaging range is made an object, and when the user's tap on the position specification reception unit is received at least two times within a time according to the user's tap, the focusing unit performs focusing on the subject included in a fifth area including at least the first area, the exposure adjusting unit performs exposure adjustment on the image while the fifth area is made an object, and the record control unit may record, on the recording medium, the image focused on the subject included in the fifth area and subjected to the exposure adjustment while the fifth area is made the object.

Besides, the input operation of the user may be an operation to a contact sensor or an optical sensor provided in the imaging apparatus.

Besides, the input operation of the user may be a tap on an area of the position specification reception unit.

Besides, there may be further included an exposure adjusting unit to perform exposure adjustment on the image while an autoexposure area in the imaging range is made an object, and an autoexposure area setting unit to set the autoexposure area to be positioned at a center of the autofocus area set at an arbitrary position in the imaging range.

Besides, there is further included a signal processing unit to perform a signal process on the image obtained by picking up an image of the subject by the imaging unit, and when the position specification reception unit receives the position specification in the autofocus frame displayed on the display unit, the signal processing unit performs the signal process on the image in a state where focusing is achieved on the subject included in the autofocus area, and the record control unit may record the image after the signal process on the recording medium.

According to another embodiment of the present invention, there is provided an imaging method which includes the steps of: displaying, on a display unit, an image obtained by picking up an image of a subject by an imaging unit; displaying, on the image displayed on the display unit, an autofocus frame representing an autofocus area in an imaging range of the image pick up unit; receiving position specification in the autofocus frame displayed on the display unit by a position specification reception unit that is disposed to be superimposed on the display unit and receives user's position specification to the image displayed on the display unit; and recording, on a recording medium, the image in a state where focusing is achieved on the subject included in the autofocus area according to reception of the position specification.

According to still another embodiment of the present invention, there is provided a program for causing a computer to execute the steps of: displaying, on a display unit, an image obtained by picking up an image of a subject by an imaging unit; displaying, on the image displayed on the display unit, an autofocus frame representing an autofocus area in an imaging range of the image pick up unit; receiving position specification in the autofocus frame displayed on the display unit by a position specification reception unit that is disposed to be superimposed on the display unit and receives user's position specification to the image displayed on the display unit; and recording, on a recording medium, the image in a state where focusing is achieved on the subject included in the autofocus area according to reception of the position specification.

As described above, according to the embodiments of the invention, photographing can be stably performed without an operation error due to differences between individuals by the simple operation system in which the user can intuitively grasp the position of the AF area.

DETAILED DESCRIPTION OF THE INVENTION

Figure 1:
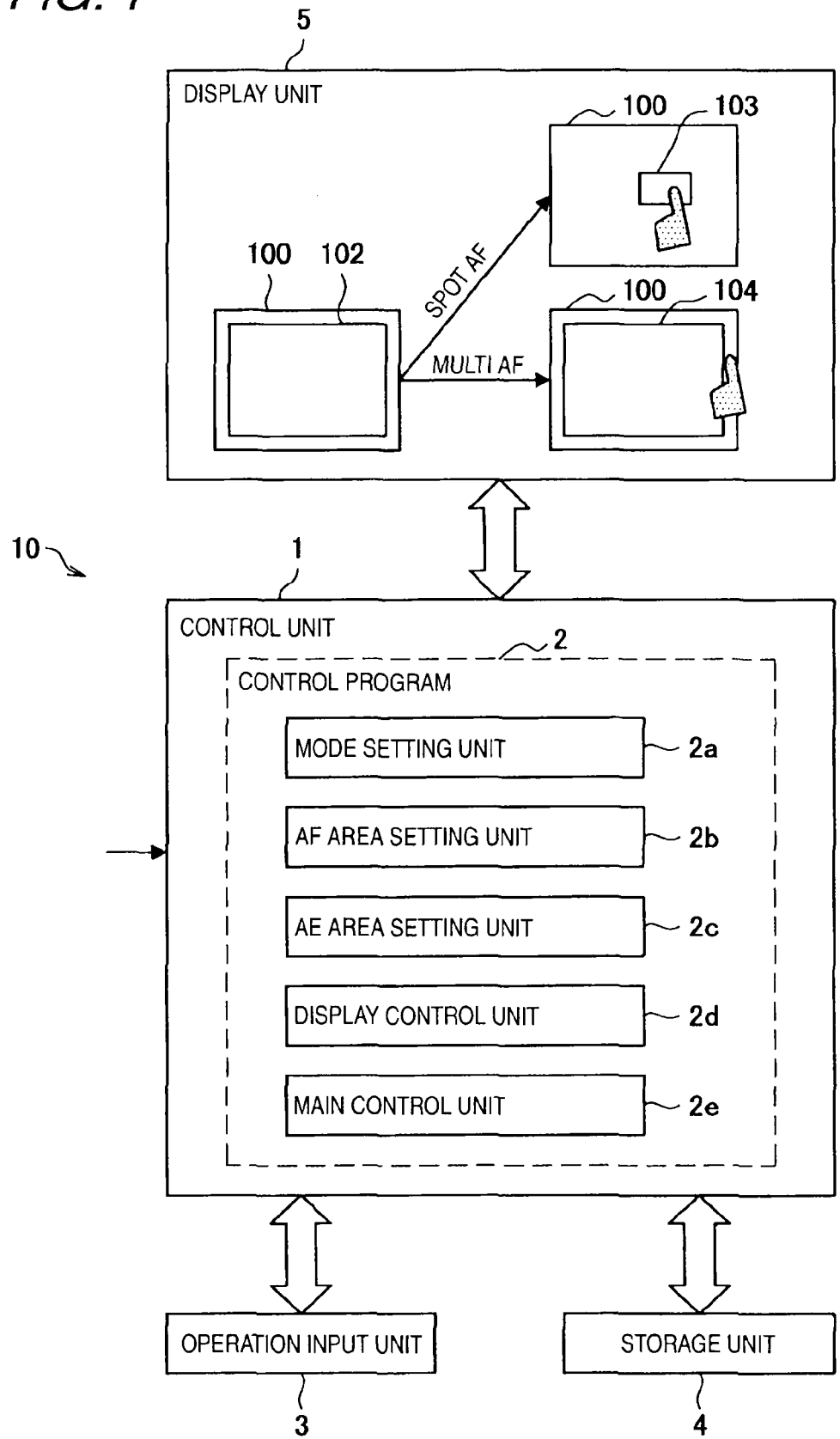
FIG. 1 is a schematic structural view showing an imaging apparatus of a first embodiment of the invention.

Hereinafter, preferred embodiments of the invention will be described in detail with reference to the accompanying drawings. Incidentally, in the present specification and drawings, components having substantially the same function are denoted by the same reference numeral, and the duplicate description thereof will be omitted.

First Embodiment

First, a schematic structure of an imaging apparatus 10 of a first embodiment if the invention will be described with reference to FIG. 1. FIG. 1 is a schematic structural view showing the imaging apparatus 10 of the embodiment.

As shown in FIG. 1, the imaging apparatus 10 of the embodiment includes a digital camera (for example, a digital still camera) capable of picking up at least a still image. The imaging apparatus 10 picks up an image of a subject, converts a still image obtained by imaging into digital system image data and records it on a recording medium. The imaging apparatus 10 has an autofocus (AutoFocus: hereinafter referred to as AF) function for automatically focusing a lens device (not shown) on a subject, and an autoexposure (AutoExposure: hereinafter referred to as AE) function for automatically adjusting the exposure of a picked-up image.

As shown in FIG. 1, the imaging apparatus 10 of the embodiment includes a control unit 1 to control the whole operation of the imaging apparatus 10, an operation input unit 3 to receive an input operation of a user to the imaging apparatus 10, a storage unit 4 including a recording medium such as a semiconductor memory, and a display unit 5 including a liquid crystal display (LCD) or the like.

The control unit 1 reads and executes a control program 2 stored in the storage unit 4, and functions as, for example, a mode setting unit 2a, an AF area setting unit 2b, an AE area setting unit 2c, a display control unit 2d and a main control unit 2e.

The control unit 1 sets a mode of the imaging apparatus 10 by the mode setting unit 2a. In more detail, the mode includes, for example, an AF mode such as a multi AF mode or a spot AF mode, and an AE mode such as a multi AE mode or a spot AE mode. The mode setting unit 2a may set such a mode based on the user input to the operation input unit 3 or may automatically set according to an imaging condition.

Here, the multi AF mode is a mode in which AF control is performed on plural areas or points in a picked-up image (in an imaging range), and is sometimes called a multi-area AF or a multi-point AF. In such a multi AF mode, as compared with the spot AF mode, a multi AF area (an area in a multi AF frame 104 of FIG. 1) is set in a relatively wide area (for example, an area of the whole screen or a predetermined area around and including the center of the screen) in a screen 100 of the display unit 5, and focusing is automatically performed with reference to the wide multi AF area. The multi AF frame 104 is set in an AF detectable frame 102 representing a maximum area where AF detection can be performed in the screen 100.

In a general multi AF mode, the predetermined range around and including the center of the screen 100 of the display unit 5 is divided into plural areas (or points), and the AF control is performed with reference to the plural areas (AF areas). From the mounting cost and the process cost of the imaging apparatus 10, the number of the AF areas (or points) and the arrangement position are limited, however, the multi AF can be theoretically performed for the whole screen 100.

Figure 2:
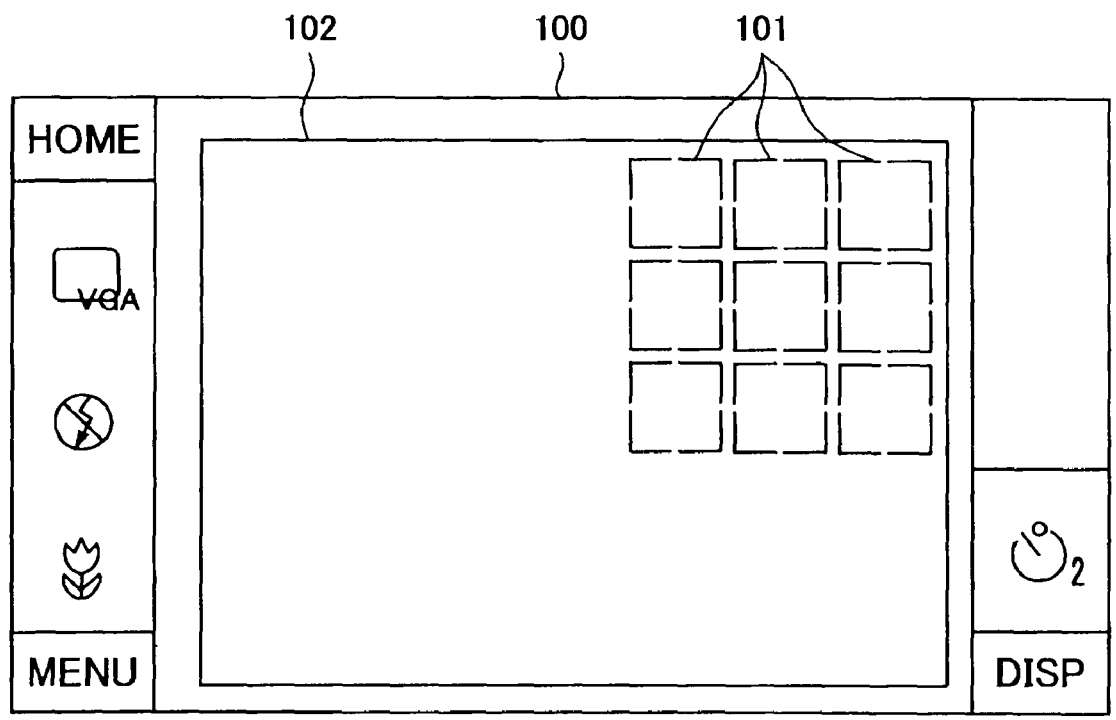
FIG. 2 is a display screen example showing a multi AF area of the embodiment.

On the other hand, in the imaging apparatus 10 of the embodiment, although the foregoing general AF mode can be performed, for example, a predetermined area containing a spot AF area specified by a user, not the center of the screen 100, is set as a multi AF area, and the multi AF can also be performed with reference to the multi AF area. This means that for example, as shown in FIG. 2, on the screen 100 of the display unit 5 of the imaging apparatus 10, plural AF areas (areas in AF frames 101 of FIG. 2) set in the multi AF area (area in the multi AF frame 104) are not arranged at and around the center of the screen 100, but are arranged at an arbitrary position on the screen 100. By doing so, the AF control can be performed for plural AF areas in the range close to the position which is intentionally specified by the user.

On the other hand, the spot AF mode is a mode in which the AF control is performed with reference to a relatively narrow spot AF area (area in a spot AF frame 103 of FIG. 1) which can be set at an arbitrary position in a picked-up image (in an imaging range). In this spot AF mode, the spot AF frame 103 is moved to the arbitrary position on the screen according to the user's position specification to the operation input unit 3, and focusing can be performed on a very small subject or a narrow area.

In the multi AF mode, the plural AF areas 101 are provided in a wide range on the screen 100, and the focusing operation is performed on the subject in the wide range. By this, when the user merely inputs a photographing instruction (for example, a shutter button is depressed, or a touch panel is tapped), a picture in which focus is achieved on an area on the screen 100 can be quickly taken. However, according to the state of the subject, focusing is not necessarily performed on the subject at a position intended by the user. Then, in the spot AF mode, the user specifies an arbitrary area on the screen 100 as the AF area so that the range of the AF control is narrowed to one point, and the control can be performed so that focusing is certainly achieved on the intended subject.

The AF area setting unit 2b sets the AF area (multi AF area or spot AF area) in the imaging range (that is, in the screen 100 of the display unit 5). The AF area setting unit 2b may set the multi AF area in a predetermined area in the screen 100, or as shown in FIG. 2, may set it in a predetermined area at and around an arbitrary position in the screen 100 specified by the user. Besides, the AF area setting unit 2b sets a spot AF area at an arbitrary position in the screen 100 specified by the user's tap on a touch panel (corresponding to a position specification reception unit) constituting the operation input unit 3.

Besides, the multi AE mode is a mode in which similarly to the multi AF mode, a relatively wide area in the screen 100 is set as a multi AE area, and the exposure of the image is controlled while plural areas or points included in the multi AE area are made objects. In the multi AE mode, the exposure adjustment can be performed on the subject in the wide range on the screen 100.

On the other hand, the spot AE mode is a mode in which similarly to the spot AF mode, the exposure control is performed with reference to a relatively narrow spot AE area which can be set at an arbitrary position in the picked-up image (in the imaging range). In this spot AE mode, the spot AE frame is moved to the arbitrary position on the screen according to the user's position specification to the operation input unit 3, and the exposure adjustment can be performed for a very small subject or a narrow area.

The AE area setting unit 2c sets the AE area (multi AE area or spot AE area) in the imaging range (that is, in the screen 100 of the display unit 5). The multi AE area may be set in the same area as the multi AF area or may be set in an arbitrary area in the screen 100. Besides, the spot AE area may be set in the same area as the spot AF area or may be set in an arbitrary area in the screen 100.

The AE area setting unit 2c may set the AE area to be positioned at the center of the AF area set at an arbitrary position in the imaging range (in the screen 100). By this, the AE area is set at the center of the AF area, and the exposure adjustment can be performed with reference to the subject on which focusing is achieved by the AF process, and accordingly, the image quality of the picked-up image can be improved.

The display control section 2d controls the display process of the display unit 5. For example, the display control unit 2d controls the display unit 5 so that the AF frame 103 or 104 representing the AF area set by the AE area setting unit 2c is superimposed on the image displayed on the screen 100 and is displayed. By this, the user can recognize by the AF frame 103 or 104 displayed on the display unit 5 that the present mode is the multi AF mode or the spot AF mode, and can also recognize that the subject included in the AF frame 103 or 104 is a focusing object.

Besides, the display control unit 2d causes the display unit 5 to display information indicating whether the focusing process on the subject included in the AF area is completed. For example, the display control unit 2d changes the color display of the AF frame according to the focusing state, for example, the AF frame 103 or 104 is displayed to be white at non-focused time and to be green at focused time. As stated above, by displaying the information indicating whether the focusing process is completed or not, the user can easily recognize whether the focusing process by the focusing unit of the imaging apparatus 10 is completed or not. Besides, the display control unit 2d causes the display unit 5 to display, as the information indicating the range where the AF area can be specified, for example, the AF detectable frame 102 on the display unit 5. By this, since the user can recognizes the range where the spot AF area can be set, the position specification of the spot AF frame using the touch panel can be suitably performed.

The main control unit 2e controls various processing operations performed by the imaging apparatus 10. The main control unit 2e includes, for example, an imaging control unit to control an imaging process of a subject, a focusing control unit to control a focusing process on the subject, an exposure control unit to control an exposure adjustment process on a picked-up image, a photographing and recording control unit to control a signal process of a picked-up image and a recording process on a recording medium, and a reproduction control unit to control a reproduction process of the image recorded on the recording medium.

The operation of the imaging apparatus 10 having the structure as stated above will be described. When the imaging apparatus 10 remains on standby for photographing, a moving image (live view image) obtained by picking up the subject is displayed on the display unit 5. While viewing such a moving image, the user adjusts the imaging range of the imaging apparatus 10 to the desired subject and takes a photograph.

At this time, for example, in the case where the imaging apparatus 10 is set in the multi AF mode, when receiving the photographing instruction (for example, depression of the shutter button) of the user to the operation input unit 3, the control unit 1 sets a predetermined area in the screen 100 as the multi AF area, and focusing is automatically performed on the subject included in the multi AF area (multi AF process). Thereafter, the image obtained by picking up an image of the subject is subjected to the signal process such as compression, and is recorded on the recording medium.

On the other hand, in the case where the spot AF mode is set, the control section 1 causes the display control unit 2d to display the AF detectable frame 102 on the screen 100 of the display unit 5 for a predetermined time. By this, the user is made to recognize the range in which the AF point can be set, and is urged to perform position specification of the AF point (spot AF frame 103) in the range. In this embodiment, when the user taps (first tap) a desired position of, for example, a touch panel (corresponding to a position specification reception unit) as the operation input unit 3, the position of the AF point can be specified. Incidentally, the tap means that the user touches the touch panel superimposed on the screen 100 of the display unit with, for example, his/her own finger or a touch tool such as a touch pen. By the tap, an arbitrary position in the moving image displayed on the display unit 5 can be specified.

Subsequently, the control unit 1 detects the position of the AF point desired by the user in the screen 100 by an input signal (for example, coordinate information indicating the tapped position) from the touch panel receiving the position specification by the first tap. Then, the control unit 1 uses the main control unit 2e to determine whether the AF point is in the range of the AF detectable frame 102. When the AF point is in the range, the control unit 1 sets, on the screen 100 of the display unit 5, the spot AF area including and around the specified position (AF point) by the first tap. Further, the control unit 1 displays the spot AF frame 103 representing the AF area on the moving image of the display unit 5.

Here, while focus is not achieved on the subject in the AF frame 103 (at non-focused time), the AF frame 103 is displayed as, for example, a white frame, and after focus is achieved on the subject (at focused time), the AF frame 103 is displayed as, for example, a green frame. However, the display method of the AF frame is not limited to the example as stated above, and as another example, a method is conceivable in which, while focus is not achieved on the subject, the AF frame 103 is blinked and displayed, and when focus is achieved on the subject, the AF frame 103 is normally displayed.

Next, the photographing and recording process as a feature of the imaging apparatus 10 of the embodiment will be described. When focus is achieved on the subject in the AF frame 103 (at focused time), when the user taps a desired position of the touch panel (second tap), the touch panel detects the second tap position (user's position specification), and outputs coordinate information indicating the second tap position to the control unit 1. Then, the control unit 1 determines whether the tap position is included in the AF frame 103. As a result of this, when the second tap position is included in the AF frame 103, the control unit 1 performs the photographing and recording process, and records the still image of the picked-up image on the recording medium. On the other hand, when the second tap position is not included in the AF frame 103, the control unit 1 does not perform the photographing and recording process, but moves the AF frame 103 to the new position specified by the second tap.

On the other hand, when the user taps (second tap) a desired position of the touch panel while focus is not achieved on the subject in the AF frame 103 (at non-focused time), the touch panel detects the second tap position (user's position specification), and outputs coordinate information indicating the second tap position to the control unit 1. Then, the control unit 1 determines whether the second tap occurs within a predetermined time from the first tap. When the second tap occurs within the predetermined time, the control unit 1 cancels the setting of the spot AF frame 103 specified by the first tap, and again sets, for example, the whole screen 100 as the multi AF area. The control unit 1 performs the multi AF control using the multi AF area, and performs the photographing and recording process. Here, although the example in which the multi AF control is performed for the whole screen 100 is described here, in practice, the multi AF frame 104 representing the multi AF area may be an arbitrary area as long as it is a wide area containing the AF frame 103.

On the other hand, when the second tap is performed after the predetermined time or more elapses from the first tap, the spot AF frame 103 is moved to the new position specified by the second tap. Next, the spot AF control is performed for the area in the spot AF frame 103 after the movement, and the photographing and recording process is performed. Of course, the position specification of the AF area by the second tap is effective only in the range of the AF detectable frame 102. When a position outside the AF detectable frame 102 is specified, the position specification of the AF area by the second tap is cancelled, and the position specification state of the AF area is returned to the initial state (that is, non-specified state).

Up to here, the outline of the imaging method of the imaging apparatus 10 of the embodiment has been described. In the operation system in the spot AF mode of the embodiment, the touch panel is used as the position specification reception unit to specify the position of the moving image (live view image) obtained by picking up an image of the subject, and the tap on the touch panel is made a trigger and the photographing and recording process is performed. At this time, when the inside of the spot AF frame 103 displayed on the display unit 5 is tapped, the photographing and recording process is performed. Hereinafter, the structure of the imaging apparatus 10 of the embodiment and the imaging method will be described in more detail.

Figure 3:
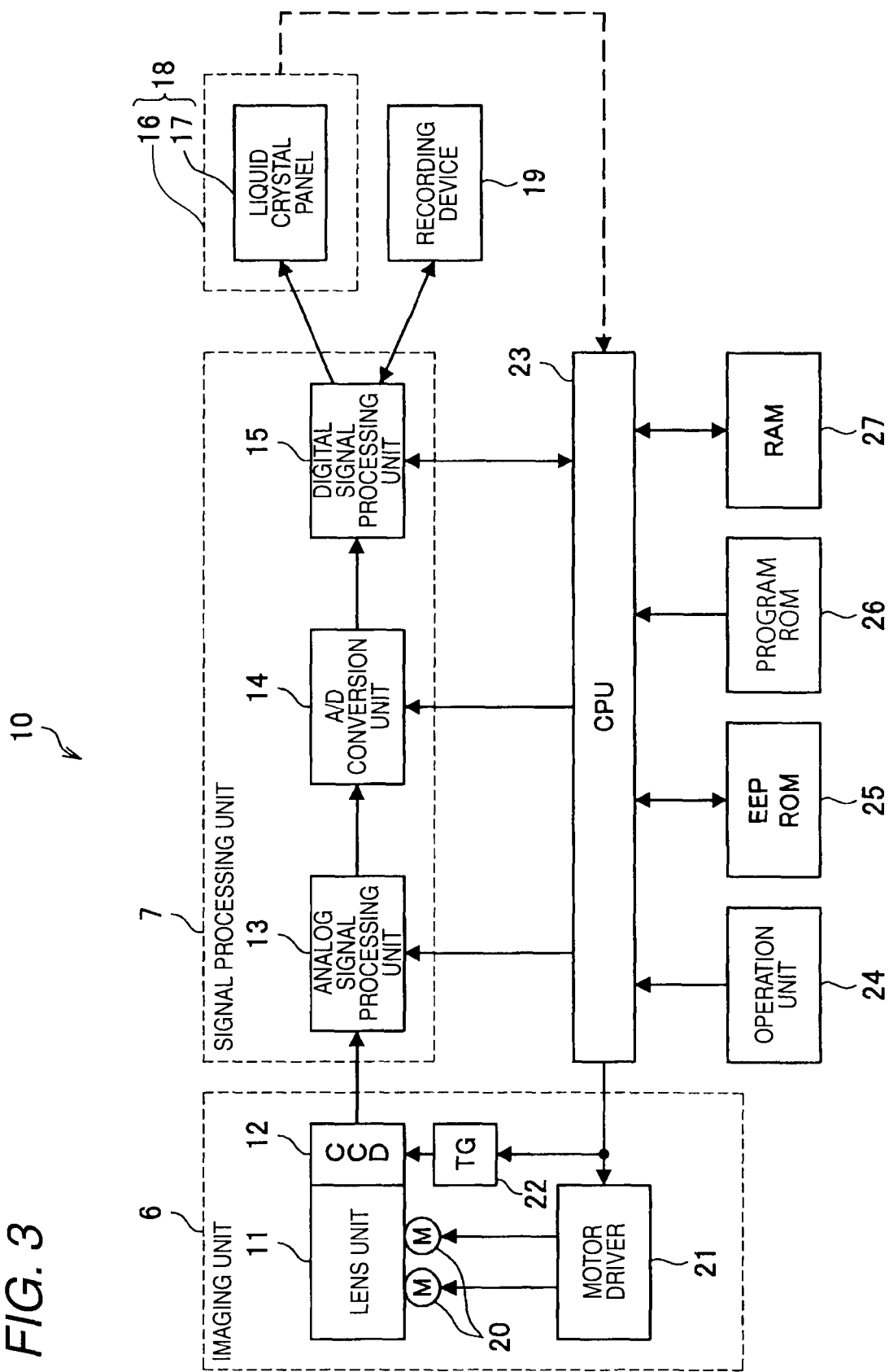
FIG. 3 is a block diagram showing a hardware structure of the imaging apparatus of the embodiment.

Next, the hardware structure of the imaging apparatus 10 of the embodiment will be described with reference to FIG. 3. FIG. 3 is a block diagram showing the hardware structure of the imaging apparatus 10 of the embodiment.

As shown in FIG. 3, the imaging apparatus 10 of the embodiment includes a lens unit 11 including an optical system (not shown) such as, for example, a photographing lens, a diaphragm, a focus lens, and a zoom lens. An imaging device 12 such as a CCD (Charge Coupled Device) or a C-MOS (Complementary Metal Oxide Semiconductor) is disposed on an optical path of a subject light incident through the lens unit 11. The imaging device 12 performs photoelectric conversion of an optical image condensed on the imaging surface by the lens unit 11 and outputs an image signal.

The output of the imaging device 12 is connected to the input of a digital signal processing unit 15 through an analog signal processing unit 13 and an analog/digital (A/D) conversion unit 14. The output of the digital signal processing unit 15 is electrically connected to the input of a liquid crystal panel 17 and a recording device 19. The analog signal processing unit 13, the A/D conversion unit 14 and the digital signal processing unit 15 constitute a signal processing unit 7. The signal processing unit 7 executes a predetermined signal process on the image signal outputted from the imaging device 12, and outputs the image signal after the signal process to the liquid crystal panel 17 or the recording device 19.

The lens unit 11 is mechanically connected to an actuator 20 as a drive mechanism to adjust the diaphragm constituting the lens unit and to move the focus lens. The actuator 20 is connected to a motor driver 21 to perform the drive control. The lens unit 11, the imaging device 12, the actuator 20, the motor driver 21 and a TG 22 constitute an imaging unit 6. The imaging unit 6 picks up an image of a subject, and outputs an image signal obtained by the imaging.

The motor driver 21 controls the operation of the respective parts of the imaging unit 6 based on instructions from a CPU 23. For example, at the time of imaging, the motor driver 21 controls the drive mechanism of the imaging unit 6 and drives the zoom lens, the focus lens, the diaphragm and the like in accordance with the user operation to an operation unit 24 or a touch panel 16, so that an image of a subject is picked up at suitable focus, exposure and the like. The timing generator (TG) 22 outputs a timing signal to control the imaging timing of the imaging device 12 to the imaging device 12 in accordance with the instruction from the CPU 23.

Further, the imaging apparatus 10 includes the CPU (Central Processing Unit) 23 corresponding to the control unit 1 (see FIG. 1) to control the whole imaging apparatus 10. The CPU 23 is connected to the motor driver 21, the TG 22, the operation unit 24, an EEPROM (Electrically Erasable Programmable ROM) 25, a program ROM (Read Only Memory) 26, a RAM (Random Access Memory) 27, and the touch panel 16.

Incidentally, the CPU 23 reads and executes a control program stored in the storage medium such as the program ROM 26, so that it functions as the mode setting unit 2a, the AF area setting unit 2b, the AE area setting unit 2c, the display control unit 2d, the main control unit 2e and the like. Besides, the CPU 23 and the imaging unit 6 function as a focusing unit to automatically perform focusing (AF control) on the subject included in the predetermined AF area in the imaging range of the imaging unit 6. Further, the CPU 23 and the imaging unit 6 function also as an exposure adjusting unit to automatically perform exposure adjustment (AE control) on the image while the predetermined AE area in the imaging range is made an object.

The touch panel 16 is a transparent pressure-sensitive touch panel disposed to be superimposed on the surface of the liquid crystal panel 17. The touch panel 16 and the liquid crystal panel 17 constitute a touch screen 18. The touch panel 16 is an example of the position specification reception unit of the embodiment, and receives an input operation of a user. The liquid crystal panel 17 corresponds to the display unit 5. When the user taps the touch panel 16 with a finger or a touch pen, the touch panel 26 detects the coordinate of the tap position, and outputs it to the CPU 23. Incidentally, as the position specification reception unit, an arbitrary position detection device other than the touch panel 16 may be used as long as the user's position specification to the picked-up image displayed on the display unit can be detected.

The recording device 19 includes, for example, a disk such as a DVD (Digital Versatile Disc), a semiconductor memory such as a memory card, a magnetic tape, or another removable recording medium, and is attachable to and detachable from the main body of the imaging apparatus 10. The recording device 19 can also be configured to have a semiconductor memory, a disk, a HDD or the like incorporated in the imaging apparatus 10. The recording device 19 records, as image data, an image signal subjected to the signal process by the signal processing unit 7 onto the recording medium based on the instruction of the CPU 19 (corresponding to the record control unit). The recording device corresponds to a recording unit to record image data obtained by imaging.

The operation unit 24 is operation means provided separately from the touch panel 16, and includes, for example, various buttons such as a shutter button and a power button, a switch, a lever, a dial, an arrow key and the like. Besides, the operation unit 24 may include a user input detection unit to detect a predetermined user input, such as a contact sensor or an optical sensor.

The EEPROM 25 stores data to be held also when the power is turned off, such as various set information. The program ROM 26 stores a program to be executed by the CPU 23, and data necessary to execute the program. The RAM 27 is a work area when the CPU 23 executes various processes and temporarily stores a necessary program and data.

Figure 4A:
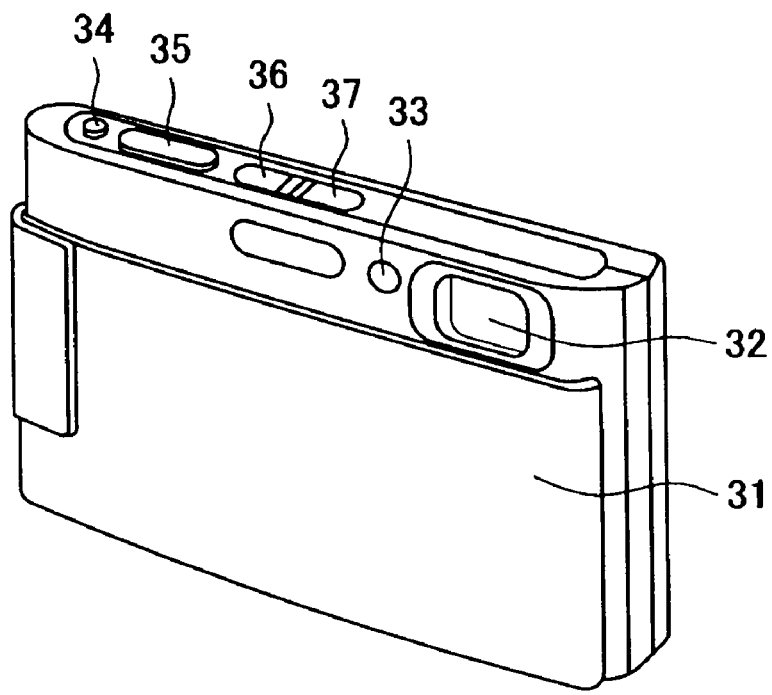
FIG. 4A is a front perspective view showing the imaging apparatus of the embodiment.
Figure 4B:
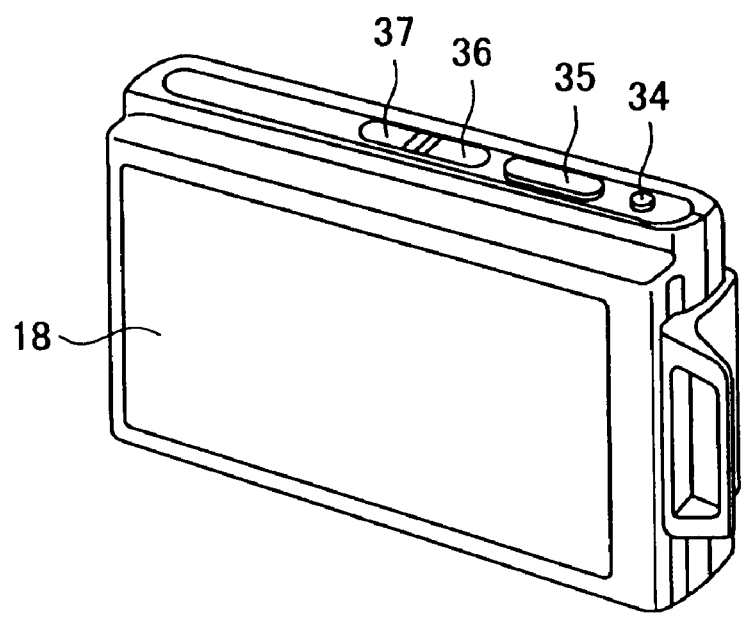
FIG. 4B is a rear perspective view showing the imaging apparatus of the embodiment.

Here, an example of an outer appearance structure of the imaging apparatus 10 of the embodiment will be described with reference to FIG. 4A and FIG. 4B. FIG. 4A and FIG. 4B are respectively a front perspective view and a rear perspective view showing the imaging apparatus 10 of the embodiment.

As shown in FIG. 4A and FIG. 4B, the front of the imaging apparatus 10 is covered with a slide type lens cover 31. When the lens cover 31 of the front is slid downward and is opened, a photographing lens 32 constituting the lens unit 11 and an AF illuminator 33 are exposed. The AF illuminator 33 is used also as a self-timer lamp. The back of the imaging apparatus 10 is provided with the touch screen 18 so as to occupy most of the back.

A zoom lever (TELE/WIDE) 34, a shutter button 35, a reproduction button 36, and a power button 37 are disposed on the upper surface of the imaging apparatus 10. The zoom lever 34, the shutter button 35, the reproduction button 36, and the power button 37 are examples of the operation unit 24 shown in FIG. 3. When the user depresses the shutter button 35, the photographing operation can be instructed. However, in the imaging apparatus 10 of the embodiment, since photographing can be performed only by the input operation to the touch panel 16, the shutter button 35 may be omitted. Besides, as an operation tool for imaging instructions, instead of the shutter button 35, an operation tool, such as, for example, a contact sensor or an optical sensor, which does not need the depressing operation of the user, may be disposed. By this, hand movement due to the full depression of the shutter button 35 at the time of photographing is prevented and the photographing can be stably performed.

Next, the operation of the imaging apparatus 10 of the hardware structure as described above will be described. The CPU 23 executes the program recorded on the program ROM 26 to control the respective parts constituting the imaging apparatus 10, and executes a predetermined process according to a signal from the touch panel 16 or a signal from the operation unit 24. The operation unit 24 supplies the signal corresponding to the operation of the user to the CPU 23.

That is, when a finger or a touch pen touches an arbitrary position of the touch panel 16 so that depression (that is, tap) is performed, that is, when the user performs a predetermined operation input, the coordinate of the position depressed by the touch panel 16 is detected, and the signal of the coordinate is sent to the CPU 23. The CPU 23 acquires predetermined information corresponding to the coordinate, and executes a predetermined process based on the information.

(a) AF Control

At the time of imaging, first, when a subject light is incident on the imaging device 12 through the lens unit 11, the imaging device 12 picks up an image of a subject in the imaging range. That is, the imaging device 12 performs photoelectric conversion of an optical image condensed on the imaging surface by the lens unit 11, and outputs an analog image signal. At this time, the motor driver 21 drives the actuator 20 based on the control of the CPU 23. By this driving, the lens unit 11 is exposed/contained from/in the housing of the imaging apparatus 10. Besides, by this driving, the adjustment of the diaphragm constituting the lens unit 11 and the movement of the focus lens constituting the lens unit 11 are performed. In this way, the lens device 11 is automatically focused on the subject in the AF area (automatic focusing control).

(b) AE Control

Further, the timing generator 22 supplies the timing signal to the imaging device 12 based on the control of the CPU 23. The exposure time and the like in the imaging device 12 are controlled by the timing signal. The imaging device 12 operates based on the timing signal supplied from the timing generator 22, receives the incident light from the subject through the lens unit 11 to perform the photoelectric conversion, and supplies the analog image signal as the electric signal corresponding to the amount of received light to the analog signal processing unit 13. In this way, adjustment is automatically performed so that the exposure of the image obtained by picking up an image of the subject becomes appropriate (automatic exposure control).

(c) Signal Process

The analog signal processing unit 13 performs an analog signal process (amplification, etc.) on an analog image signal sent from the imaging device 12 based on the control of the CPU 23, and supplies an image signal obtained as a result thereof to the A/D conversion unit 14. The A/D conversion unit 14 performs A/D conversion of the analog image signal from the analog signal processing unit 13 based on the control of the CPU 23, and supplies digital image data obtained as a result thereof to the digital signal processing unit 15.

The digital signal processing unit 15 performs a necessary digital signal process such as noise removal, white balance adjustment, color correction, edge reinforcement, or gamma correction on the digital image signal from the A/D conversion unit 14 based on the control of the CPU 23, and supplies it to the liquid crystal panel 17 to be displayed thereon.

(d) Compression Recording Process

Besides, the digital signal processing unit 15 compresses the digital image signal from the A/D conversion unit 14 by a predetermined compression coding system such as, for example, JPEG (Joint Photographic Experts Group), and supplies a compressed digital image signal obtained as a result thereof to the recording device 19 to be recorded.

(e) Reproduction Process

Further, the digital signal processing unit 15 expands the compressed image data recorded on the recording device 19, and supplies the image data obtained as a result thereof to the liquid crystal panel 17 to be displayed thereon.

(f) Display Process of the Live View Image

The digital signal processing unit 15 supplies the moving image data from the A/D conversion unit 14 to the liquid crystal panel 17, and by this, the live view image of the picked-up subject in the imaging range is displayed on the liquid crystal panel 17. The live view image (moving image) is used for the user to visually recognize the imaging range, the angle of view, the state of the subject and the like in order to take a desired still image. Thus, the image quality of the live view image is not demanded as compared with the still image (photograph) recorded on the recording device 19. Thus, from the viewpoint of speedup of the imaging process and improvement in easiness, the moving image in which data density is lower than the still image to be recorded and the signal process is simplified is used for the live view image.

In addition, the digital signal processing unit 15 forms an image of the AF frame (multi AF frame, spot AF frame, etc.) used for the focus control based on the control of the CPU 23, and supplies the AF frame to the liquid crystal panel 17 to be displayed thereon.

As described above, in the imaging apparatus 10 of the embodiment, the AF frame is set on the image picked up by the imaging device 12, and the focus is controlled based on the image in the inside of the AF frame. In the AF function, the AF frame can be set at an arbitrary position on the image displayed on the liquid crystal panel 17, and further, the control of the position and the size thereof can be performed only by the operation to, for example, the touch panel 16 constructed integrally with the liquid crystal panel 17. The AF process is realized in such a way that the CPU 23 reads and executes the program of the program ROM 26.

When the moving image (live view image) picked up by the imaging unit 6 is displayed on the liquid crystal panel 17 as stated above, the user points the imaging apparatus 10 at a desired subject, fixes an angle, and takes a photograph. At the time of photographing, in general, the user performs a predetermined operation (for example, depression of the shutter button) to the operation unit 24, and instructs the imaging apparatus 10 to perform a photographing operation. In response to the user operation, a release signal is supplied to the CPU 23 from the operation unit 24. In this way, when the release signal is supplied to the CPU 23, the CPU 23 controls the digital signal processing unit 15, causes the image data supplied from the A/D conversion unit 14 to the digital signal processing unit 15 to be compressed, and causes the recording device 19 to record the compressed image data. Hereinafter, the process is called a "photographing and recording process".

Here, the "photographing and recording process" in the imaging apparatus 10 of the embodiment will be described in more detail. The photographing and recording process of the embodiment is the process in which a still image obtained by picking up an image of a subject by the imaging unit 6 is compressed by a predetermined compression coding system, and is recorded on the recording device 19. As described above, in the photographing operation of the imaging apparatus 10, (a) AF control in the imaging unit 6, (b) AE control in the imaging unit 6, (c) signal process (for example, amplification of an image signal, noise removal process, etc.) in the signal processing unit 7, and (d) image data compression process in the digital signal processing unit 15 and recording process in the recording device 19 are performed. Among them, (c) the signal process and (d) the compression recording process correspond to the "photographing and recording process" of the embodiment.

Next, the feature of an operation system at the time of the photographing and recording process in the imaging apparatus 10 of the embodiment will be described roughly. When the photographing and recording process is performed in the imaging apparatus 10 of the embodiment, the touch panel 16 has only to be used, and the shutter button 35 may not be used. In detail, at the time of photographing, first, the user taps a desired position of the touch panel 16, so that the spot AF frame 103 is specified. Next, the AF process is performed on the subject in the specified AF frame 103, and after the AF process is completed, the user again taps the touch panel 16. When an area inside the spot AF frame 103 is specified by the second tap, the CPU 23 determines that the release signal is supplied, and executes the photographing and recording process. By this, image data focused on the subject in the AF frame 103 is compressed by the digital signal processing unit 15 and is recorded on the recording device 19.

Alternatively, when the AF process is being performed (that is, when the focusing process is not completed), when the user specifies an arbitrary position of the touch panel 16 and taps it within a predetermined time from the first tap of specifying the spot AF frame 103, the CPU 23 determines that the release signal is supplied, and performs the photographing and recording process. However, in this case, the position specification of the spot AF frame 103 is cancelled, and for example, the whole screen 100 of the liquid crystal panel 17 is set to the multi AF area, the multi AF control is performed to perform focusing, and the photographing and recording process is performed. By this, also in the case where focusing is not achieved in the spot AE, focusing in the wider multi AF area is tried, and the photographing and recording process is forcibly performed, so that it is possible to prevent a shutter chance from being lost.

Incidentally, here, although the example is described in which the multi AF control is performed for the whole focusing screen 100, no limitation is made to the example. The multi AF area may be any area as long as the area includes an area in the spot AF frame 103 specified by the first tap and is wider than the area.

As described above, in this embodiment, in addition to the photographing method by the depression of the shutter button 35, the photographing method using only the touch panel 16 can also be used, and therefore, the more convenient imaging apparatus 10 can be provided.

Figure 5:
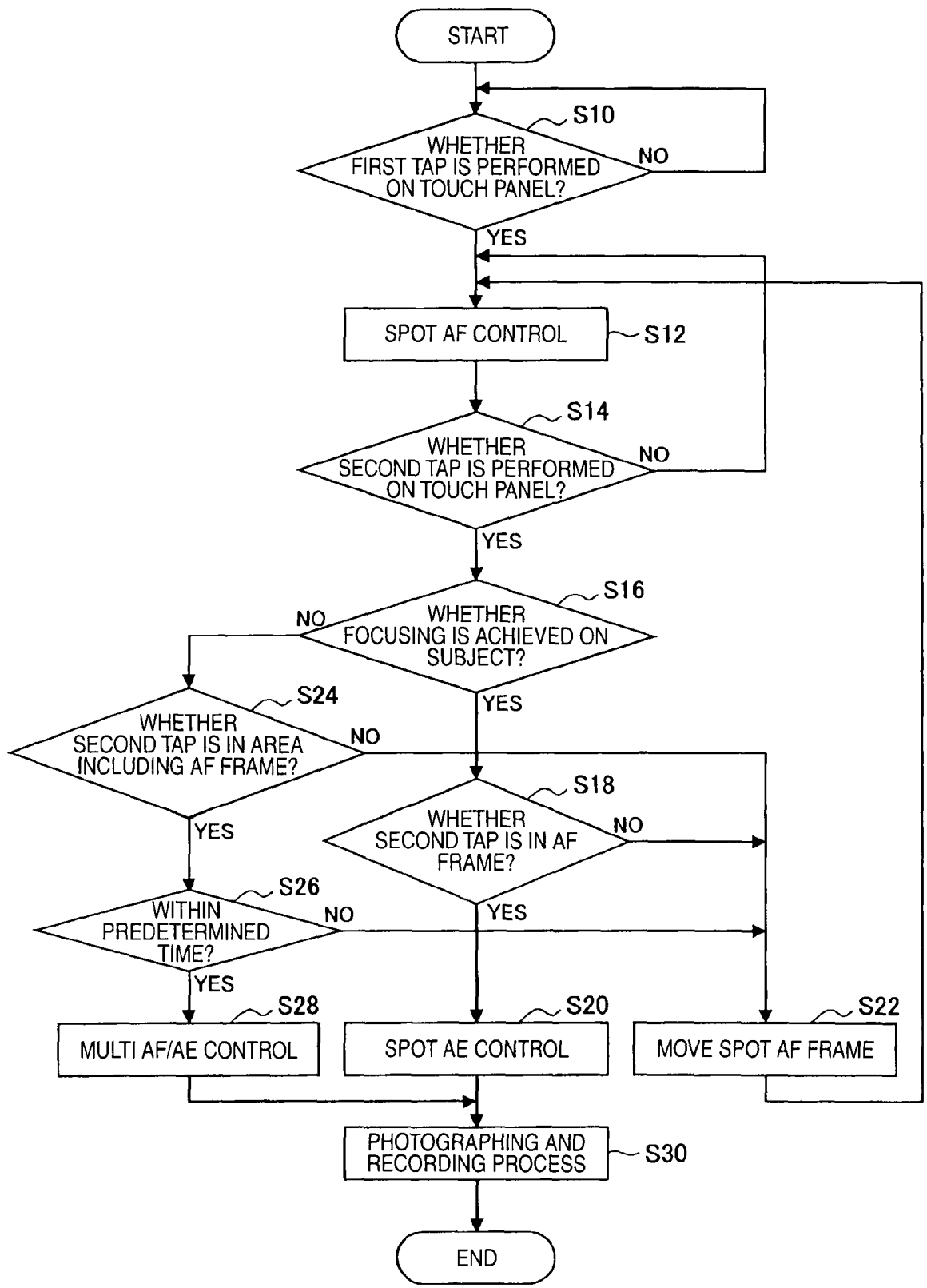
FIG. 5 is a flowchart showing an imaging method of the imaging apparatus of the embodiment.
Figure 6:
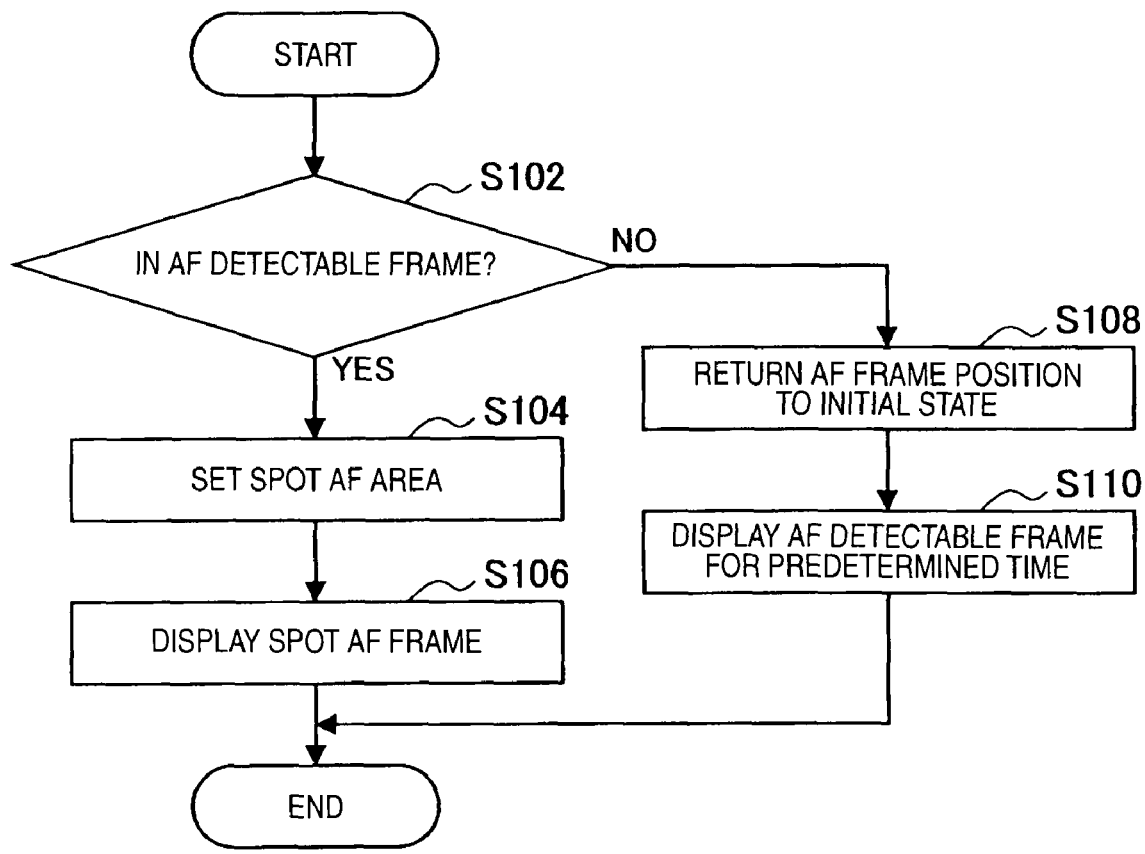
FIG. 6 is a flowchart showing the details of step S10 of FIG. 5.

Next, the photographing method of the imaging apparatus 10 of the embodiment will be described in detail with reference to FIG. 5 and FIG. 6. FIG. 5 is a flowchart showing the imaging method of the imaging apparatus 10 of the embodiment, and FIG. 6 is a flowchart showing the details of step S10 of FIG. 5. The imaging method described below relates to a method at the time when the imaging apparatus 10 operates in a mode generally called a continuous AF mode.

The outline of the imaging method shown in FIG. 5 will be described. First, the user performs a first tap at a desired position of the touch panel 16 of the imaging apparatus 10, and specifies the position of the spot AF area (S10). Then, the imaging apparatus 10 is automatically placed in the continuous AF mode, performs the spot AF control on the specified spot AF area (S12), and is placed in a lock state (state where the focusing process is completed) of the spot AF (S16). Thereafter, when the second tap position of the user on the touch panel 16 is in the AF lock frame (S18), the imaging apparatus 10 performs the spot AE control (S20) and takes a photograph (S30). On the other hand, when the second tap position of the user is outside the AF lock frame, the imaging apparatus 10 moves the spot AF frame to the second tap position (S22).

Besides, it is assumed that before the lock state of the spot AF occurs by the AF control at S12 (that is, at the time when focusing is not completed), the second tap is performed on the touch panel 16. At this time, when the second tap position is in a predetermined first area wider than the AF frame (S24) and the second tap is performed within a predetermined time from the first tap (S26), the imaging apparatus 10 performs the multi AF/AE control (S28) and takes a photograph (S30). Besides, when the second tap is performed after the predetermined time or more passes from the first tap (S26), or when the second tap position is outside the first area (S30), the imaging apparatus 10 moves the spot AF frame specified by the first tap to the second tap position (S22).

Next, the flow of FIG. 5 will be described in more detail. As shown in FIG. 5, first, at step S10, the CPU 23 of the imaging apparatus 10 determines whether the user performs the first tap on the touch panel 16, that is, whether the position specification (AF point specification) of the spot AF area by the user is received. When the position specification of the spot AF area is not performed, that is, the user does not tap the touch panel 16, the CPU 23 repeats the check of the input from the touch panel 16 until the position specification is performed.

When the user performs the first tap on the touch panel 16 to specify the position of the spot AF area, the touch panel 16 receives the user's position specification to the image (live view image) displayed on the liquid crystal panel 17 (position specification reception step). The touch panel 16 detects the position specified by the first tap, and notifies the CPU 23 of the coordinate of the first tap position.

Here, the details of the process (step S10) at the time when the first tap is performed will be described with reference to FIG. 6. As shown in FIG. 6, first, the CPU 23 determines whether the position specified by the first tap is in the AF detectable frame 102 according to the first tap (step S102). When the specified position is in the AF detectable frame 102, at step 104, the CPU 23 specifies a predetermined area including and around the position specified by the first tap as the spot AF area (AF area setting step). Next, at step S106, the CPU 23 causes the spot AF frame 103 surrounding the set spot AF area to be displayed on the image (live view image) displayed on the liquid crystal panel 17 (AF frame display step). Then, the flow of FIG. 6 is ended, and advance is made to step S12 of FIG. 5.

On the other hand, when the specified position is outside the AF detectable frame 102, first, at step S108, the CPU 23 returns the position setting of the spot AF frame 103 to the initial state. Further, at step 110, in order to show the AF detectable range to the user, the CPU 23 displays, on the live view image of the liquid crystal panel 17 and for a predetermined time, the AF detectable frame 102 representing the range where the spot AF frame can be specified. Thereafter, return is made to step S10 of FIG. 5, and waiting is performed until the next position specification (tap) to the touch panel 16 occurs.

Figure 7A:
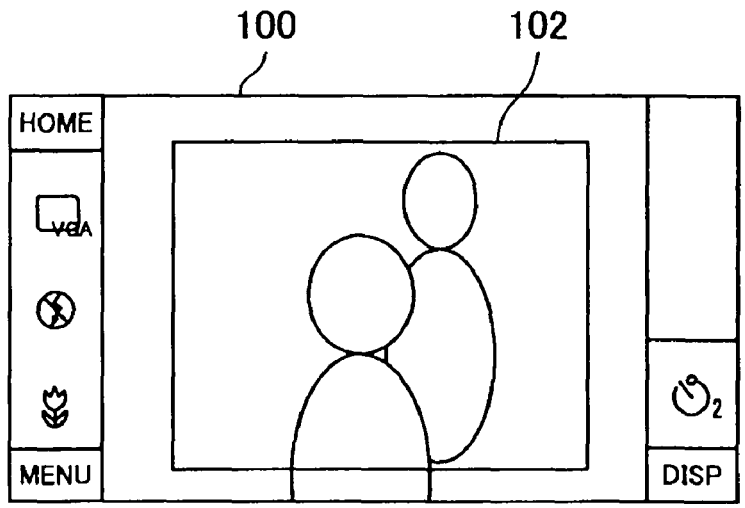
FIG. 7A is a display screen example showing a specific example of a display process of S102 to S110 of FIG. 6.
Figure 7B:
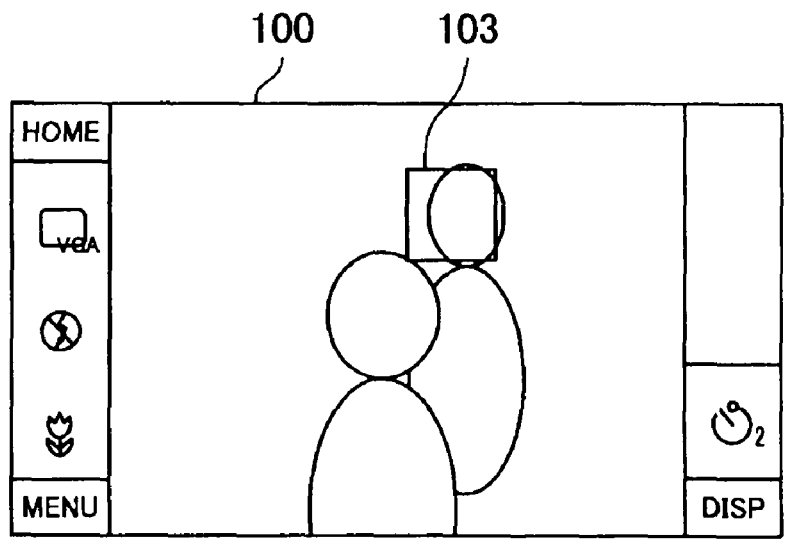
FIG. 7B is a display screen example showing a specific example of the display process of S102 to S110 of FIG. 6.
Figure 7C:
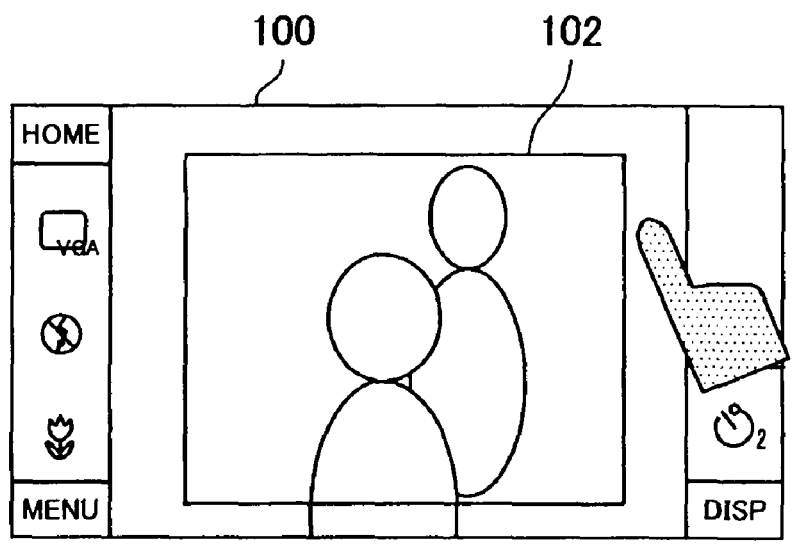
FIG. 7C is a display screen example showing a specific example of the display process of S102 to S110 of FIG. 6.

FIGS. 7A to 7C show a specific example of the display process of S102 to S110 of FIG. 6. As shown in FIG. 7A, before the first touch, the live view image as the moving image picked up by the imaging apparatus 10 and the AF detectable frame 102 are displayed on the screen 100 of the touch screen 18 of the imaging apparatus 10.

When the user taps the inside of the AF detectable frame 102 and specifies the AF point, as shown in FIG. 7B, the AF detectable frame 102 disappears on the screen 100 of the touch panel 18, and the rectangular spot AF frame 103 including and around the specified AF point is displayed. On the other hand, when the user taps a position outside the AF detectable frame 102 (S101), as shown in FIG. 7C, the AF detectable frame 102 is again displayed on the screen 100 of the touch panel 18 (S105). By this, it is possible to urge the user to again specify the AF point in the range of the AF detectable frame 102.

Next, at step S12 of FIG. 5, the CPU 23 executes the spot AF control with reference to the spot AF area set at the position specified by the first tap and starts the focusing process on the subject included in the spot AF area (focusing step). As shown in FIG. 7B, in the spot AF control, the automatic focusing process generally called the continuous AF is performed in the predetermined narrow area (spot AF frame 103) including and around the position specified by the first tap. That is, even if the user stops the tap on the touch panel 16, the CPU 23 continuously performs control so that focusing is performed on the subject in the spot AF frame 103 on the screen 100. At this time, the focus lens and the like of the lens unit 11 are driven by the focusing unit so that focus is achieved on the subject included in the area in the spot AF frame 103.

When focus is achieved on the subject during the execution of the spot AF control, that is, when focusing is completed, the display of the spot AF frame 103 on the liquid crystal panel 17 is changed from, for example, white to green, and it is notified to the user that focusing is completed. Incidentally, the display method of the AF frame at the focused time and at the non-focused time is arbitrary as long as the user can distinguish between both, and no limitation is made to the example. As another example, for example, there is a method in which at the non-focused time, the AF frame is blinked, and at the focused time, the blinking of the AF frame is stopped and normal display is performed.

Next, during the execution of the spot AF control, at step S14, the CPU 23 continuously checks whether the user performs the second tap on the touch panel 16. Also in this check process, similarly to step S10, the check of the tap position using the AF detectable frame 102 is executed (see FIG. 6). When the position specification of the spot AF area is not performed, that is, when the user does not perform the second tap on the touch panel 16, the CPU 23 repeats the check of the input from the touch panel 16 until the second tap is performed, and continuously executes the spot AF frame control (S12).

When the user performs the second tap on the touch panel 16, the touch panel 16 receives the user's position specification to the image (live view image) displayed on the liquid crystal panel 17 according to the second tap (position specification reception step). The touch panel 16 detects the position specified by the second tap, and notifies the CPU 23 of the coordinate of the second tap position. Then, advance is made to step S16.

At step S16, the CPU 23 determines whether the focusing process on the subject included in the spot AF frame 103 (spot AF area) is completed. As a result thereof, when the focusing process is completed, advance is made to step S18, and when the focusing process is not completed, advance is made to step S24.

Next, at step S18, it is determined whether the position (second tap position) specified by the second tap at S14 is in the spot AF frame 103. When the second tap position is in the spot AF frame 103, the spot AE control is performed at step S20. In this spot AE control, for example, similarly to the spot AF frame 103, exposure adjustment is performed with reference to the image contained in the narrow AE area. Further, at step S30, the CPU 23 controls the signal processing unit 7 and the recording device 19 to execute the photographing and recording process, causes a predetermined photographing operation to be performed, and records, on the recording device 19, image data obtained by the photographing operation and focused on the subject in the spot AF frame 103 (step S30).

On the other hand, at S18, when the second tap position is not in the spot AF frame 103, at step S22, the CPU 23 moves the spot AF frame 103 to the position specified by the second tap, and displays the spot AF frame 103 after the movement on the image on the liquid crystal panel 17. The CPU 23 again sets the spot AF area in the area in the moved spot AF frame 103, returns to the spot AF control at step S12, and executes the focusing process on the reset spot AF area. By this, when the second tap position is outside the displayed spot AF frame 103, the spot AF control can be executed in the new spot AF area including and around the position specified again by the user. Thus, even after the spot AF area is set by the first tap, the spot AF area is again set at the arbitrary position desired by the user, and focus can be achieved on the subject in the spot AF area.

Besides, when the focusing process is not completed at S16, first, at step S24, the CPU 23 determines whether the position specified by the second tap is in the predetermined first area containing the spot AF frame 103 specified by the first tap. The predetermined first area is the area including the spot AF frame 103 and larger than the spot AF frame 103. As stated above, the first area as the determination reference of the tap position at S24 is made wider than the spot AF frame 103, so that a shift of the tap position between the first and the second tap, which is not intended by the user, can be compensated.

As a result of the determination at S24, when the position specified by the second tap is outside the first area, advance is made to step S22, the CPU 23 moves the spot AF frame 103 and the spot AF area to the second tap position as stated above (step S22), and again performs the spot AF control with reference to the spot AF area after the movement (step S12). On the other hand, when the position specified by the second tap is in the first area, advance is made to step S26.

Figure 8:
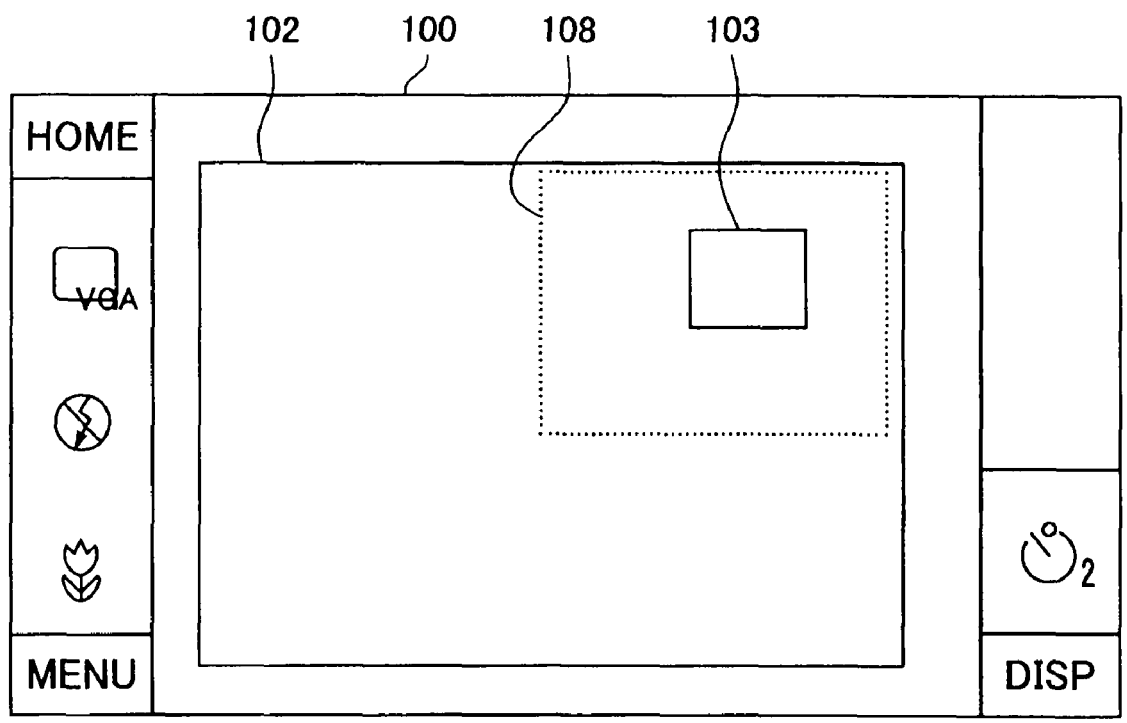
FIG. 8 is a display screen example showing a first area of the embodiment.

In this embodiment, the predetermined first area at S24 is, for example, the whole screen 100. Accordingly, when the second tap is performed at any position in the screen 100, advance is made to step S24. As stated above, in this embodiment, the first area containing the AF frame 103 is made the whole screen 100, however, no limitation is made to the example. As another example, for example, as shown in FIG. 8, among four divided areas obtained by dividing the area in the AF detectable frame 102 into four equal parts, a divided area 108 including the spot AF frame 103 may be made the first area. By this, when the user taps a position outside the divided area 108, the position of the spot AF frame 103 can be changed, and this is convenient. Besides, as another example, the predetermined first area can be made the area in the spot AF frame 103 of FIG. 8.

Next, at step S26, the CPU 23 determines whether the second tap (S14) is received within a predetermined time from the first tap (S10). When the second tap is received after the predetermined time passes from the first tap, advance is made to step S22. The CPU 23 moves the spot AF frame 103 and the spot AF area to the second tap position (step S22), and again performs the spot AF control (step S12).

On the other hand, when the second tap is received within the predetermined time from the first tap (that is, a double-tap is performed), advance is made to step S28. At step S28, the CPU 23 executes the multi AF/AE control with reference to a predetermined second area (for example, the whole screen 100) containing the spot AF frame 103 specified by the first tap (step S28). Further, at step S30, the CPU 23 controls the signal processing unit 7 and the recording device 19 to execute the photographing and recording process, and records, on the recording device 19, the image data focused on the subject in the multi AF frame 104 (step S30).

As stated above, even in the case where focusing is not performed in the spot AF control, when the user performs the double-tap within the predetermined time, the multi AF control in which focusing is relatively more easily performed than the spot AF control is executed, and the photographing and recording process is forcibly performed. By this, the user does not lose a shutter chance, and the possibility that the picked-up image becomes out of focus can be reduced by the multi AF control.

Incidentally, in this embodiment, in the multi AF/AE control at S28, for example, the whole screen is made the multi AF/AE area, and the AF/AE control is performed. However, no limitation is made to the example as stated above. For example, the AF control may be performed for the predetermined second area containing the spot AF frame 103 specified by the first tap. For example, as shown in FIG. 8, among four divided areas obtained by dividing the area in the AF detectable frame 102 into four equal parts, the divided area 108 including the spot AF frame 103 is made the second area, and the multi AE/AF control may be performed with reference to the divided area 108.

Besides, in this embodiment, when the double-tap (S26) is received within the predetermined time, in order to prevent out-of-focus blur, the multi AF/AE process is performed at S28. However, no limitation is made to the example as stated above. For example, at S28, the spot AF/AE control may be performed with reference to the first spot AF area specified at S10. By this, the photographing and recording process can be performed while priority is given to the focusing and the exposure adjustment on the spot AF area and the spot AE area specified by the user.

Incidentally, in the imaging method shown in FIG. 5, when photographing is performed in the spot AF, the spot AE area is set to be positioned at the center of the spot AF area, so that the exposure adjustment process is performed with reference to the spot AF area. On the other hand, when a photograph is taken in the multi AF, the exposure adjustment process is performed with reference to a relatively wide area such as, for example, the whole screen 100. However, in the latter case, no limitation is made to the example in which the whole screen 100 is made the reference, and the exposure adjustment process may be performed with reference to a predetermined wide area including the spot AF frame 103. As stated above, the AE area is made coincident with the AF area, so that the balance between the focusing control and the exposure control can be taken.

Up to here, the imaging method of the first embodiment has been described with reference to FIG. 5 to FIG. 8. In this embodiment, the spot AF area is specified by the simple operation such as the double-tap on the touch panel 16 of the imaging apparatus 10, and the execution of the photographing and recording process can be instructed.

Besides, when the user slowly taps the touch panel 16 two times, in the state where focusing is achieved on the subject at the desired position in the image by the spot AF control, photographing can be performed stably (S10→S14→S18→S30). On the other hand, when the user quickly taps the touch panel 16 two times, photographing can be quickly performed (S10→S14→S26→S30), and the shutter chance is not lost. As stated above, since the tap operation of the user on the touch panel 16 and the photographing operation performed by the imaging apparatus 10 according to the tap operation coincide with each other in the feeling of the user, it is possible to provide the user with the intuitive and simple operation system.

Besides, according to the first tap (S10), the imaging apparatus 10 automatically starts the spot focusing process with reference to the spot AF area specified by the first tap (S12). Accordingly, the user can specify the spot AF area only by performing the first tap, and even if the shutter button 35 is not half-pressed as in the related art, the focusing process can be automatically started, and this is convenient.

Second Embodiment

Next, an imaging apparatus 10 and an imaging method of a second embodiment of the invention will be described. The imaging apparatus 10 and the imaging method of the second embodiment are different from the first embodiment only in a method of spot AF control coupled with a first tap on a touch panel 16, and the other structure is substantially the same as the first embodiment, and accordingly, the detailed description thereof will be omitted.

Figure 9:
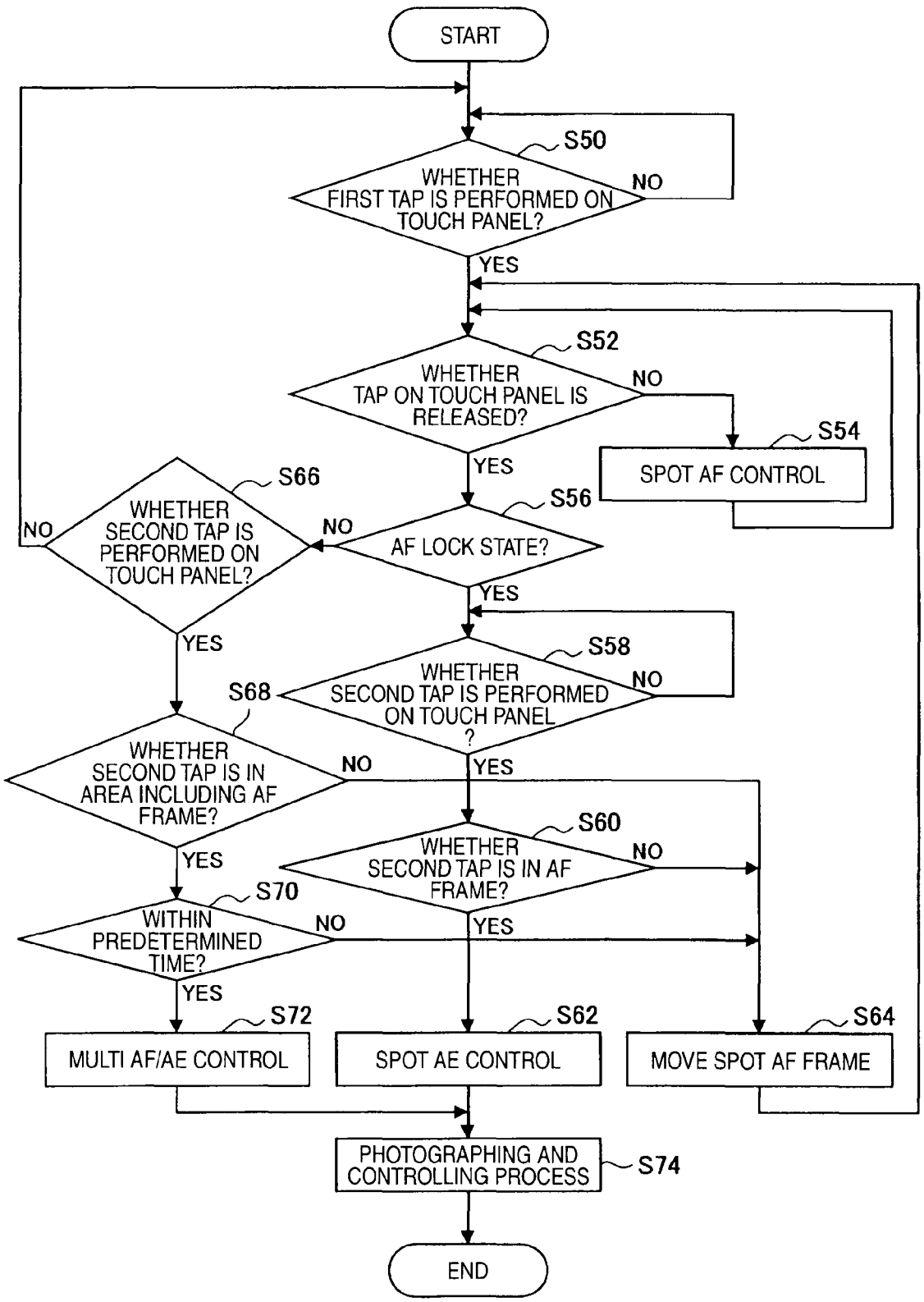
FIG. 9 is a flowchart showing an imaging method of an imaging apparatus of a second embodiment of the invention.

First, the imaging method of the imaging apparatus 10 of the second embodiment of the invention will be described in detail with reference to FIG. 9. FIG. 9 is a flowchart showing the imaging method of the imaging apparatus 10 of the embodiment. The imaging method is the method of picking up an image after an AF lock operation is performed in the imaging apparatus 10.

The outline of the imaging method shown in FIG. 9 will be described. First, the user performs a first tap at a desired position of the touch panel 16 of the imaging apparatus 10, and specifies the position of a spot AF area (S50). While the user does not release the first tap on the touch panel 16 but continuously presses it (S52), the imaging apparatus 10 performs the spot AF control on the specified spot AF area (S54) and is placed in a lock state of the spot AF (state where the focusing process is completed) (S56). Thereafter, when a position where the user performs a second tap on the touch panel 16 is in the AF lock frame (S60), the imaging apparatus 10 performs spot AE control (S62) and takes a photograph (S30). On the other hand, when the position where the user performs the second tap is outside the AF lock frame (S60), the imaging apparatus 10 moves the spot AF frame to the second tap position (S64).

Besides, when the tap on the touch panel 16 is released before the lock state of the spot AF occurs by the AF control at S54 (S52), when the second tap position is in a predetermined first area larger than the spot AF frame (S68) and the second tap is performed within a predetermined time from the first tap (S70), the imaging apparatus 10 performs multi AF/AE control (S72) and takes a photograph (S74). Besides, when the interval between the first tap and the second tap is the predetermined time or more (S70), or when the second tap position is outside the predetermined first area (S68), the imaging apparatus 10 moves the spot AF frame specified by the first tap to the second tap position (S64).

Next, the flow of FIG. 9 will be described in more detail. As shown in FIG. 9, first, at step S50, the CPU 23 of the imaging apparatus 10 determines whether the user performs the first tap on the touch panel 16, that is, whether the position specification (AF point specification) of the spot AF area by the user is received. When the position specification of the spot AF area is not performed, that is, when the user does not tap the touch panel 16, the CPU 23 repeats the check of input from the touch panel 16 until the position specification is performed.

When the user performs the first tap on the touch panel 16 to specify the position of the spot AF area, the touch panel 16 receives the user's position specification to the image (live view image) displayed on the liquid crystal panel 17 according to the first tap of the user (position specification reception step). The touch panel 16 detects the position specified by the first tap, and notifies the CPU 23 of the coordinate of the first tap position. Since the details of the process at the time when the first tap is performed at S50 is substantially the same as the process (S102 to S110) described in FIG. 6 and FIGS. 7A to 7C of the first embodiment, the description thereof will be omitted.

Next, at step S52, the CPU 23 checks whether the user stops the tap on the touch panel 16. While the user continues to tap the same position on the touch panel 16, the CPU 23 continuously performs the spot AF control with reference to the spot AF area set at the position specified by the first tap (step S54). By this, the focusing process on the subject included in the spot AF area advances (focusing step).

When focus is achieved on the subject during the execution of the spot AF control, that is, when focusing is completed, the display of the spot AF frame 103 in the liquid crystal panel 17 is changed from, for example, white to green, and it is notified to the user that focusing is completed.

Besides, after focusing is once achieved on the subject in the spot AF area, the focusing unit locks the setting of the position of the spot AF frame 103 and the focus distance of the lens. This state is called an AF lock state, and thereafter, even if the user stops the first tap (that is, even if the finger or the like is separated from the touch panel 16), the set position of the AF frame 103 and the focus distance of the lens are kept, and the AF lock state remains until the user performs a predetermined operation to the imaging apparatus 10. The specified operation here is, for example, an operation in which the user taps another position on the touch panel 16 and sets a new AF area, a photographing operation, a depression of an AF lock release key or the like.

Besides, while the user continues to tap the touch panel 16, the focusing unit of the imaging apparatus 10 continuously executes the spot AF control at S54. However, no limitation is made to the example, and for example, after focusing is once achieved on the subject, the AF control is omitted, and the check may be continued only to confirm whether the user stops the first tap. By this, it is possible to avoid an unnecessary AF process after focusing, and therefore, the process efficiency of the imaging apparatus 10 can be improved.

Figure 10:
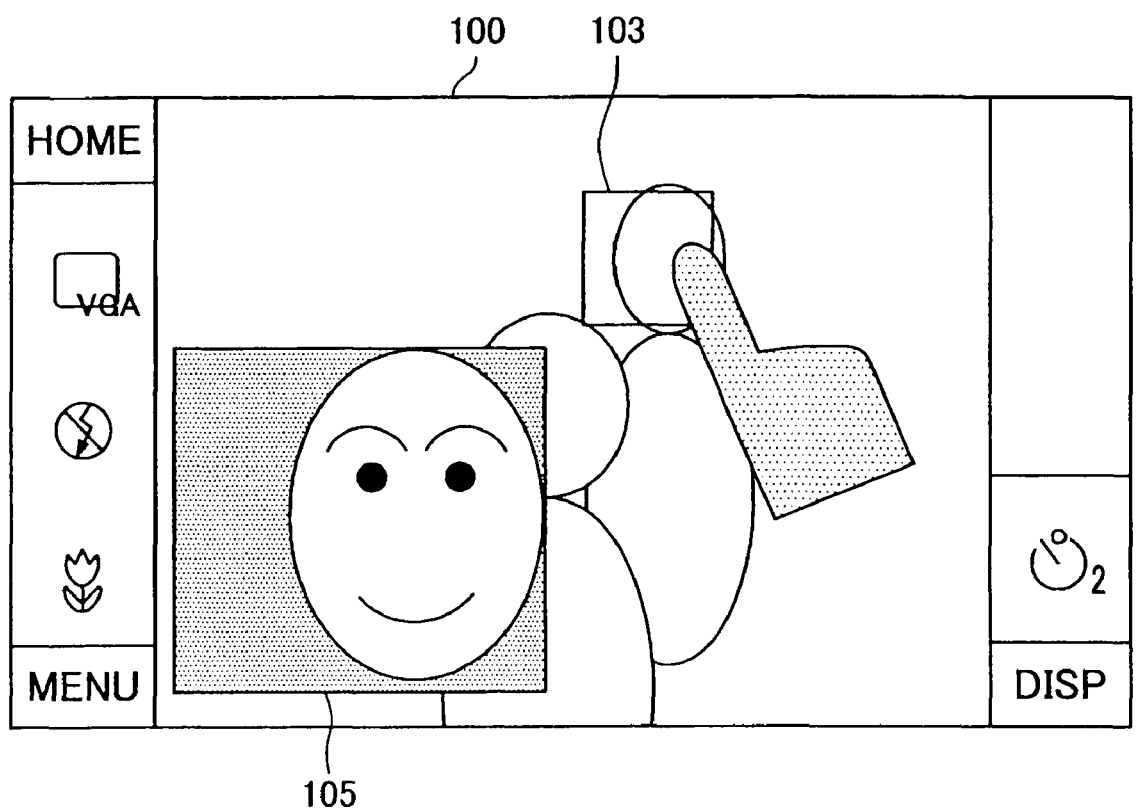
FIG. 10 is a display screen example showing a pop-up window of the embodiment.

Further, while the user continues to tap the touch panel, it is conceivable that the picked-up image of the subject displayed on the liquid crystal panel 17 is concealed by the finger or hand of the user and is hardly seen. In order to improve this, for example, as shown in FIG. 10, a pop-up window 105 is superimposed on the image and is displayed, and the image of the area in the spot AF frame 103 may be enlarged and displayed in real time at a predetermined magnification by using the pop-up window 105. By this, the user can confirm the state of the AF control by the change of the enlarged image of the pop-up window 105. Further, when the pop-up window is displayed, the tap position is made the determination reference, and it may be displayed in a free space on the screen 100, so that the visibility of the user is improved.

Next, when user stops the first tap on the touch panel 16 (S52), the CPU 23 checks whether the focusing process by the spot AF control at S54 is completed and the AF lock state occurs (step S56). When the AF lock state occurs, the CPU 23 continuously monitors whether the user performs a second tap on the touch panel 16 (step S58).

When the second tap is performed on the touch panel 16, it is determined whether the position (second tap position) specified by the second tap is in the spot AF frame 103 (step S60). When the second tap position is in the spot AF frame 103, the CPU 23 performs the spot AE control at step S62 (step S62). Further, at step S74, the signal processing unit 7 and the recording device 19 are controlled so that the photographing and recording process is performed, the predetermined photographing operation is performed, and image data obtained by this photographing operation and focused on the subject in the spot AF frame 103 is recorded on the recording device 19 (step S74).

On the other hand, at S60, when the second tap position is not in the spot AF frame 103, at step S64, the CPU 23 moves the spot AF frame 103 to the position specified by the second tap (AF frame movement step), and return is made to step 52. Incidentally, since the process of steps S60 to S64 and S74 is substantially the same as the process of steps S18 to S22 and S30 of FIG. 5, the detailed description thereof will be omitted.

Besides, when the AF lock state does not occur at step S56, the CPU 23 continuously monitors whether the user performs the second tap on the touch panel 16 (step S66). For example, when the second tap is not performed before a predetermined time has passed since the first tap was stopped, return is made to step S50, and the process is resumed from the initial state. On the other hand, when the second tap is performed on the touch panel 16 at S66, advance is made to S68.

At step S68, the CPU 23 determines whether the position specified by the second tap is in a predetermined first area containing the spot AF frame 103 specified by the first tap (step S68). The predetermined first area is the area including the spot AF frame 103 and larger than the spot AF frame 103, and is, for example, the whole screen. As stated above, the first area as the determination reference of the tap position at S68 is made the area wider than the spot AF frame 103, so that a shift of the tap position between the first and the second tap, which is not intended by the user, can be compensated.

As a result of the determination at S68, when the position specified by the second tap is outside the first area, advance is made to step S64. At S64, the CPU 23 moves the spot AF frame 103 and the spot AF area to the second tap position (step S64), and again performs the spot AF control with reference to the spot AF area after the movement (step S52). On the other hand, when the position specified by the second tap is in the predetermined first area, advance is made to step S70.

At step S70, the CPU 23 determines whether the second tap (S66) is received within a predetermined time since the first tap was stopped (S52). When the second tap is received after the predetermined time has passed since the first tap was stopped, advance is made to step S64. At this step S64, the CPU 23 moves the spot AF frame 103 and the spot AF area to the second tap position (step S64), and again performs the spot AF control with reference to the spot AF area after the movement (step S54).

On the other hand, when the second tap is received within the predetermined time since the first tap was stopped (that is, when double-tap is performed), advance is made to step S72. At step S72, the CPU 23 performs the multi AF/AE control with reference to a predetermined second area (for example, the whole screen 100) containing the spot AF frame 103 specified by the first tap (step S72). Further, at step S74, the CPU 23 controls the signal processing unit 7 and the recording device 19 to perform the photographing and recording process, and records, on the recording device 19, image data focused on the subject in the multi AF frame 104 (step S74). Incidentally, since the process of steps S68 to S74 is substantially the same as the process of steps S24 to S30 of FIG. 5, the detailed description thereof will be omitted.

Up to here, the imaging method of the second embodiment has been described with reference to FIG. 9 to FIG. 10. In the second embodiment, similarly to the first embodiment, the spot AF area is specified by the simple operation to tap the touch panel 16 of the imaging apparatus 10 two times, and the execution of the photographing and recording process can be instructed.

Besides, when the user continues to tap the touch panel 16 for more than a time necessary for the spot AF process in the first tap, and then, the second tap is performed, in the state where focusing is achieved on the subject at the desired position in the image by the spot AF control, photographing can be stably performed (S50→S54→S52→S58→S70). On the other hand, when the user quickly taps the touch panel 16 two times, photographing can be quickly performed (S50→S52→S66), and a shutter chance is not lost. In addition, at the time of the first tap, the user can continue the spot AF focusing process of the imaging apparatus 10 by continuing to tap the touch panel 16, and the user can stop the focusing process by releasing the finger from the touch panel 16 to stop the first tap. As stated above, since the tap operation of the user on the touch panel 16 and the photographing operation performed by the imaging apparatus 10 according to the tap operation coincide with each other in the feeling of the user, the intuitive and simple operation system can be provided to the user.

Effects of the First and the Second Embodiments

Up to here, the imaging apparatus 10 and the imaging method of the first and the second embodiments of the invention have been described. In the imaging apparatus 10 of the first and the second embodiments, the user can specify the position of the AF area by making the first tap on the touch panel 16 at an arbitrary position in the imaging range. Further, after the position specification by the first tap, the automatic focusing process is performed with reference to the subject in the AF area, and in the case where the second tap is performed at a predetermined position in the AF area when focus is achieved on the subject, the photographing and recording process is performed. Besides, after the position specification by the first tap, while focus is not achieved on the subject in the AF area and within the predetermined time from the first tap, when the second tap is performed in the second area containing the AF area, the imaging is performed.

According to this, the user can take a photograph by the simple operation of tapping the touch panel 16. Further, since it is not necessary to fully depress the shutter button 35 as in the related art, an unnecessary force is not applied to the imaging apparatus 10, hand movement is prevented, and photographing can be stably performed. Further, since the operation system is such that the AF frame 103 displayed on the touch panel 16 is touched, as compared with the operation system (Patent Document 2, 3) of the related art which depends on the pressing force to the touch panel or the contact area, differences between individuals are small, and photographing can be stably performed. In addition, the user can intuitively grasp that photographing is performed while focusing is performed on which area in the image displayed on the display unit 5.

As stated above, since the photographing can be performed only by using the touch panel 16 without using the shutter button 35, the operability of the user is improved. Besides, since the shutter button 35 is not necessary, the shutter button 35 may not be provided in the device main body, the manufacturing cost can be reduced, and the apparatus can be miniaturized. Besides, at the time of photographing, since the user is not restrained by the position of the shutter button 35, he/she can take a photograph while holding the imaging apparatus 10 in an arbitrary direction.

Besides, a user who uses an existing imaging apparatus having a function of specifying an AF frame using a touch panel as disclosed in Patent Document 1 already recognizes that when an arbitrary point on the screen of the touch panel is pressed, the AE/AF area coincides with the point. Accordingly, for such a user, the operation method of "after an AE/AF point is specified by a first tap, when the same point is again touched, photographing starts" is very natural and intuitive, and is easy to understand for the user.

Besides, the AE/AF frame 103 is displayed on the live view image of the liquid crystal panel 17 at the time of photographing. Thus, the user clearly grasps the position of the AE/AF frame 103 specified by himself/herself, and when the AE/AF process is completed, the display mode of the AE/AF frame 103 is changed in real time (red display or the like), and therefore, the user is not confused about the determination of photographing enabling timing.

Besides, for example, (1) when the user desires to take a photograph after focus and exposure on the subject are accurately adjusted, he/she confirms that the AE/AF process is completed on the screen 100, and then, has only to press the AE/AF frame again. On the other hand, (2) when the user desires to quickly take a photograph without losing a shutter chance, a double-tap has only to be performed on the touch panel 16 within a predetermined time. Further, in the case of (2), the imaging apparatus 10 receives the second tap in a wider range than the first tap. Thus, when the user performs the second tap, it is not necessary to strictly put the finger on the position (first specified position) where the first tap is performed, and the instruction of photographing start can be immediately given to the imaging apparatus 10.

As stated above, the imaging apparatus 10 of the embodiment can provide the operation method which satisfies the user's request for the two kinds of photographing methods and is intuitive and highly convenient, and a photograph can be taken without serious failure according to a use case.

Besides, in the embodiment, (1) in the case where photographing is performed when focus is achieved on the subject in the AF area specified by the first tap, as the photographing and recording process of the image, the AF control of the subject is omitted. On the other hand, (2) in the case where photographing is performed when focus is not achieved on the subject in the AF area specified by the first tap, the multi AF control is performed with reference to the wider first area (for example, the whole screen, the divided area 104 of FIG. 8, etc.) including the AF area.

According to this, (1) when the photographing instruction is given after the focus and exposure are accurately adjusted, since the AE/AF process is omitted in the photographing sequence, the release time can be shortened. (2) When the double-tap is quickly performed and the photographing instruction is given, since the AE/AF area is widened and the AE/AF process is performed, focus is achieved on the subject, which the user wants to bring into focus, to the extent possible, and photographing can be performed.

By this, weak points of the respective photographing systems (1) and (2) can be compensated. The former photographing system (1) has a defect that the whole photographing time is long. However, when the release time is shortened, the whole photographing time can be shortened. The later photographing system (2) is lacking in accuracy of focus position. However, the defect can be resolved or improved by widening the AF range.

Besides, according to the embodiment, (a) when a position outside the AF frame 103 is specified by the second tap after focus is achieved on the subject in the AF frame 103 specified by the first tap (step S18, S60), (b) when focus is not achieved on the subject in the AF frame 103 and the second tap is performed after a predetermined time has passed since the first tap (step S26, S70), or (c) when focus is not achieved on the subject in the AF frame 103 and a second tap is performed at a position outside the first area containing the AF frame 103 (step S24, S68), the AF area represented by the AF frame 103 is moved to the second tap position (step S22, S64). By this, in each of the cases (a), (b) and (c), after the position of the AE/AF is once specified, when the position is desired to be shifted, measures can be easily taken.

Besides, according to the embodiment, as shown in FIG. 6, in accordance with the predetermined operation, the setting of the AF frame 103 (AF area) specified by the first tap is cancelled, and the setting of the AF area is returned to the initial state. By this, the method of returning the once specified position of the AE/AF area to the initial state is also simple.

As stated above, the imaging apparatus 10 of the embodiment adopts the operation system of touching the touch panel 16, which is intuitive, has less operation errors due to the feeling of an individual and is easy to understand. Since the instruction of the photographing operation with the AF/AE control is realized by this simple operability, this is convenient for the user.

Third Embodiment

Next, an imaging apparatus 10 and an imaging method of a third embodiment of the invention will be described. The imaging apparatus 10 and the imaging method of the third embodiment are different from the first embodiment only in an operation system to a touch panel 16, and the other function and structure are substantially the same as the first embodiment, and therefore, the detailed description thereof will be omitted.

First, the feature of an operation system at the time of a photographing and recording process in the imaging apparatus 10 of the embodiment will be described schematically.

The imaging apparatus 10 of the embodiment includes, as an operation tool to instruct a photographing operation, a contact sensor 60 (see FIG. 19A) instead of the shutter button 35 (see FIGS. 4A and 4B) which is general in the related art. The contact sensor 60 is an example of the operation unit 24 shown in FIG. 3, and functions as an input detection unit to detect the user's input for instructing the imaging apparatus 10 to perform the photographing operation. The contact sensor 60 is a contact type sensor which can detect whether an object contacts. When the contact sensor 60 as stated above is used as an alternative to the shutter button 35 shown in FIGS. 4A and 4B, the user can instruct the imaging apparatus 10 to perform the photographing of a subject and a record operation by merely touching the contact sensor 60 by a finger at the time of photographing. The contact sensor 60 of this embodiment is disposed at, for example, the position of the shutter button 35 shown in FIGS. 4A and 4B on the outer housing of the imaging apparatus 10, and is electrically connected to the CPU 23.

When the photographing and recording process is performed by the imaging apparatus 10 of the embodiment, when the user touches the contact sensor 60 as a part of the operation unit 24 shown in FIG. 3 with a finger, a contact signal is supplied from the operation unit 24 to the CPU 23. In accordance with this contact signal, the CPU 23 performs the multi AF control on the whole photographing screen 100. On the other hand, when the user releases the finger from the contact sensor 60, a predetermined release signal is supplied from the operation unit 24 to the CPU 23. As stated above, when the user releases the finger from the contact sensor 60 and does not touch it, the CPU 23 does not perform the multi AF control on the whole photographing screen 100.

Besides, when the user taps an arbitrary position on the touch panel 16, a coordinate signal representing the tap position is transmitted from the touch panel 16 to the CPU 23. At this time, when the user remains touching the contact sensor 60 and focus is achieved on the subject by the multi AF control, the CPU 23 starts the photographing and recording process when the coordinate signal from the touch panel 16 is received. As described above, in the photographing and recording process, the CPU 23 controls the digital signal processing unit 15, compresses the image data supplied from the A/D conversion unit 14 to the digital signal processing unit 15, and causes the recording device 19 to record the compressed image data.

When focus is not achieved on the subject by the multi AF control, in the case where the user taps an arbitrary position on the touch panel 16 and the tap is not stopped even when a predetermined time or more passes (in the case where the tapped finger is not released for the predetermined time or more), the CPU 23 starts the photographing and recording process. In this case, the CPU 23 performs the spot AF process and the spot AE process with reference to an area at and around the tap position on the touch panel 16, and controls so that a predetermined photographing sequence is executed.

Figure 11:
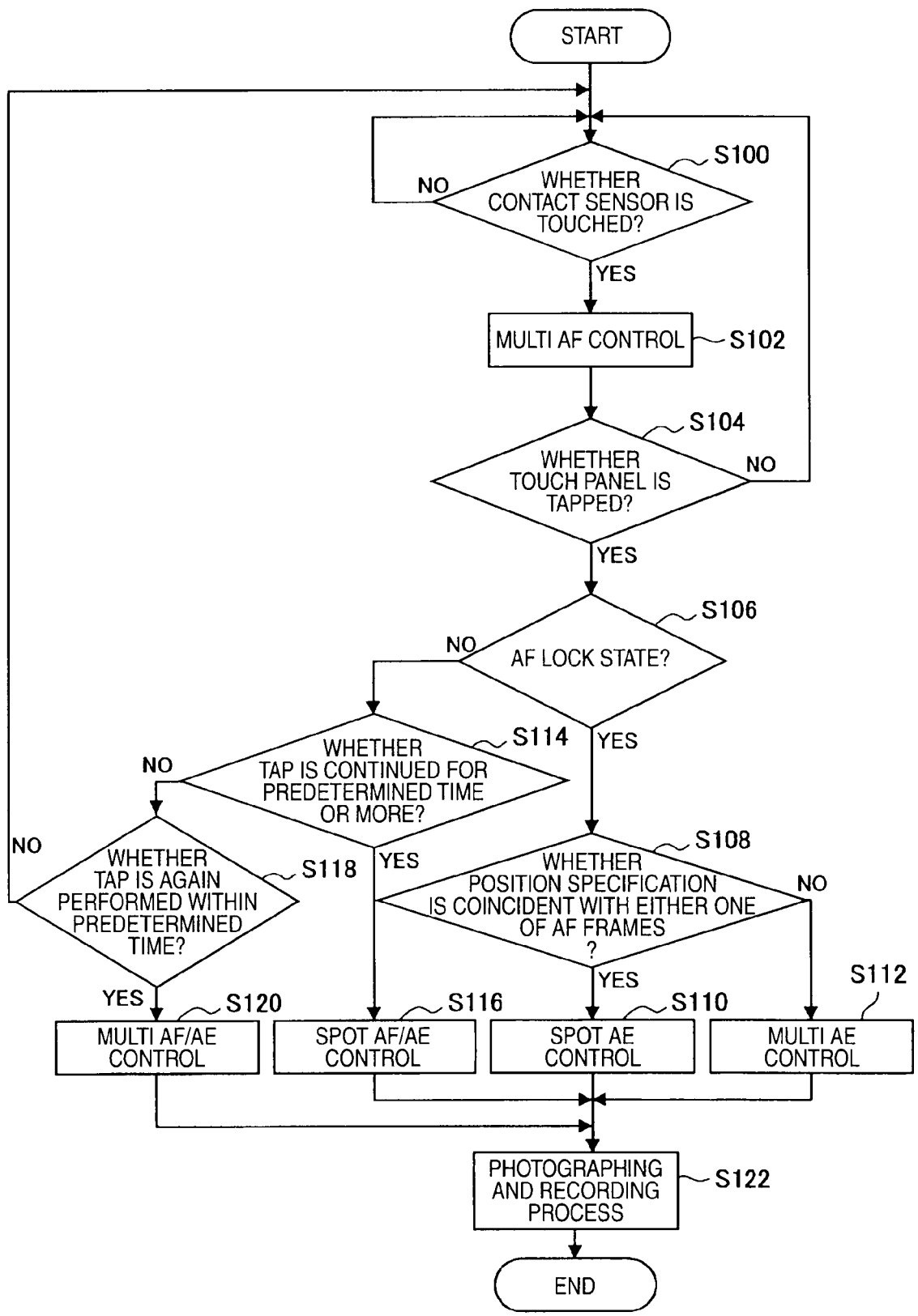
FIG. 11 is a flowchart showing an imaging method of an imaging apparatus of a third embodiment of the invention.

Next, the imaging method of the imaging apparatus 10 of the third embodiment of the invention will be described in detail with reference to FIG. 11. FIG. 11 is a flowchart showing the imaging method of the imaging apparatus 10 of the embodiment. The imaging method is a system in which the user taps the touch panel 16 after touching the contact sensor 60 of the operation unit 24, so that the imaging apparatus 10 performs the photographing and recording process.

First, the outline of the imaging method shown in FIG. 11 will be described. When the user touches the contact sensor 60 of the imaging apparatus 10 (S100), the multi AF control is performed (step S102), and the AF lock state (S106) occurs. Next, when the position where the user taps (S104) the touch panel 16 is in the AF lock frame, the spot AE is performed and photographing is performed (S110). On the other hand, when the position where the tap (S104) is performed is outside the AF lock frame, the multi AE is performed and photographing is performed (S112).

Besides, after the user touches (S100) the contact sensor 60, before the AF lock state occurs (S106), when the user continues to tap an arbitrary position of the touch panel 16 for a predetermined time or more (S114), the spot AF/AE is performed and photographing is performed (S116). Besides, before the AF lock state occurs, when the user performs double-tap at an arbitrary position of the touch panel 16 (S118), the multi AF/AE is performed and photographing is performed (S120).

Next, the flow of FIG. 11 will be described in more detail. As shown in FIG. 11, first, at step S100, the CPU 23 typically determines whether contact is made with the contact sensor 60 as the operation unit 24 (step S100). When the contact is not detected by the contact sensor 60, monitor at step S100 is repeated until the contact is detected.

Figure 12:
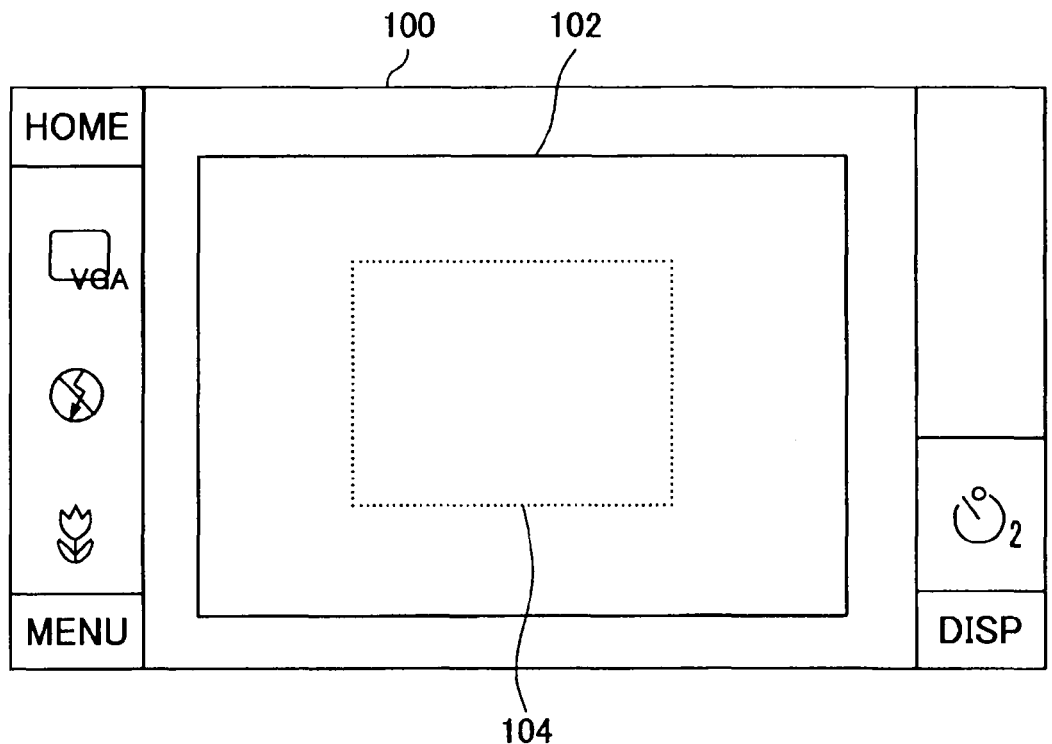
FIG. 12 is a display screen example showing a multi AF area of the embodiment.

As a result of this, when the finger of the user contacts with the contact sensor 60 and the contact with the contact sensor 60 is detected, the CPU 23 performs the multi AF control to perform focusing on the subject included in the predetermined multi AF area (step S102). In more detail, for example, as shown in FIG. 12, in accordance with the predetermined input operation (contact with the contact sensor 60), the CPU 23 first sets the multi AF area 104 to a relatively wide rectangular area (first area) positioned at the center (center of the imaging range) of the screen 100. Next, the CPU 23 controls the display unit (liquid crystal panel 17) so that the multi AF frame representing the multi AF area 104 is superimposed on the live view image and is displayed. The CPU 23 performs the multi AF control with reference to the multi AF area 104. The multi AF control is performed until focus is achieved on the arbitrary subject included in the multi AF area 104.

Figure 13:
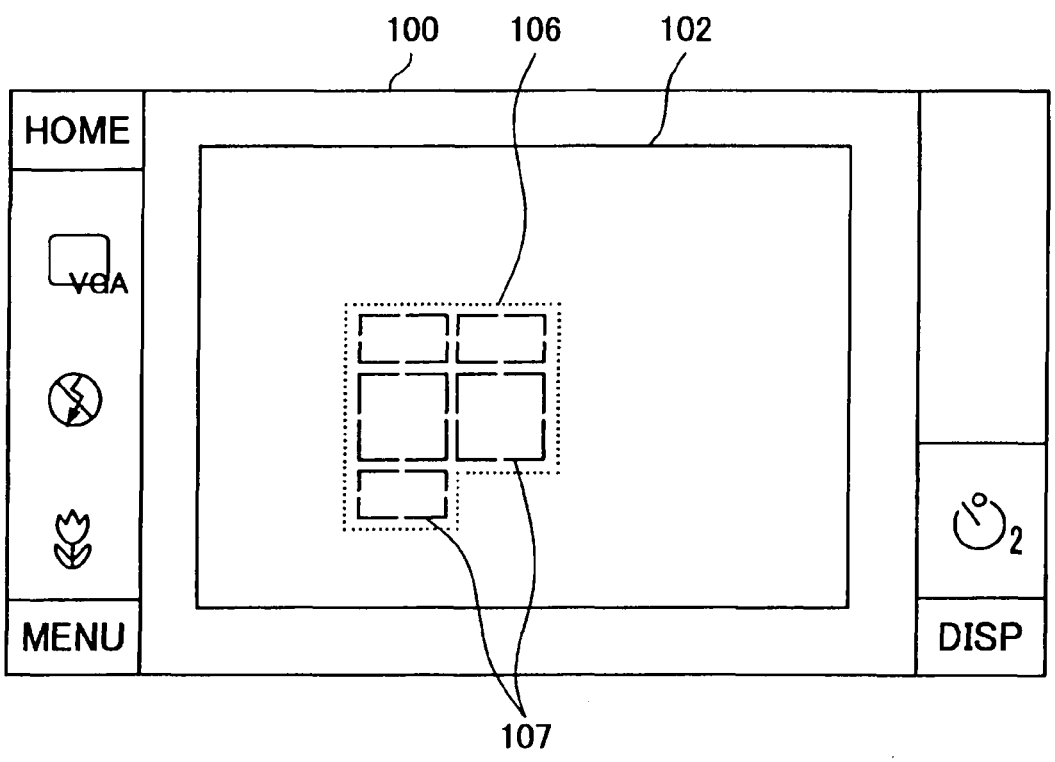
FIG. 13 is a display screen example showing a focusing area of the embodiment.

When focus is achieved on the subject by the multi AF control, in order to notify the user that focusing is achieved on the multi AF area 104, the CPU 23 causes one or two or more AF frames surrounding areas where focus is achieved in the multi AF area 104 to be displayed on the live view image of the liquid crystal panel 17. At this time, as shown in FIG. 12, there is case where focus is not achieved on the whole multi AF area 104 but is achieved only on a partial area (partial subject) in the area 104. FIG. 13 shows an example of this case. As shown in FIG. 13, when focusing is achieved only on a partial area 106 in the multi AF area 104, the CPU 23 divides the portion where focus is achieved in the focused area 106 into plural areas, and causes AF frames 107 surrounding the respective areas to be displayed.

By the display of the AF frames 107, the user can visually recognize that the focusing process is completed, and the focusing is performed on the partial area 106 in the multi AF area 104. Besides, during the execution of the multi AF control, when focus is not achieved on the subject in the screen 100, the plural AF frames 107 are not displayed, and therefore, the user can recognize that focus is not achieved on the subject. Incidentally, in this embodiment, the area 106 where focus is achieved is represented by the plural AF frames 107, however, no limitation is made to this. As another example, for example, a frame surrounding the focused partial area 106 shown in FIG. 13 is drawn and displayed, and it may be notified to the user that focusing is completed.

Incidentally, a state where focus is achieved on a subject and is fixed is called an AF lock state. After focusing is achieved on at least a partial subject in the screen 100 as stated above, while the user continues to touch the contact sensor 60, the CPU 23 controls to keep the AF lock state. When the user stops the contact with the contact sensor 60 in the AF lock state, that is, when the finger is separated from the contact sensor 60, the CPU 23 releases the AF lock state, and again starts the process from step S100.

While the multi AF control (S102) is performed, the CPU 23 checks whether the user taps the touch panel 16 (step S104). That is, the CPU 23 determines, based on the user's tap on the touch panel 16, whether the user's position specification to the live view image displayed on the liquid crystal panel 17 is received. When a tap is not performed on the touch panel 16 for a predetermined time or more from the multi AF control start (the time of contact with the contact sensor 60), return is made to step S100.

Incidentally, the AF detectable frame 102 shown in FIG. 12 is a frame line representing an AF detectable range, and the user taps the touch panel 16 only in the range of the AF detectable frame 102 and can specify the position of the spot AF frame 103. When a tap is performed on the outside of the AF detectable frame 102, the movement of the spot AF frame 103 is not performed.

At S104, when the tap on the touch panel 16 is detected, that is, the user performs a tap and when the user's position specification to the live view is received, at step S106, the CPU 23 determines whether there is a state (AF lock state) in which focus has already been achieved on the subject by the multi AF control (step S106). When the AF lock state occurs, advance is made to S108, and when the AF lock state does no occur, advance is made to S114.

At step S108, the CPU 23 checks whether the user's tap position (position specification) at S104 corresponds to an area in either one of the AF frames 107 in the focused area 106 shown in FIG. 13 (step S108). As a result of the determination, when a tap is performed on either one of the AF frames 107 in the focused area 106, the CPU 23 identifies the AF frame 107 corresponding to the tap position, and performs the spot AE control with reference to the area (second area) in the tapped AF frame 107 (step 110). Thereafter, at step S122, the CPU 23 controls the signal processing unit 7 and the recording device 19 so that the photographing and recording process is performed, causes the predetermined photographing operation to be performed, and records, on the recording device 19, image data obtained by the photographing operation and focused on the subject in the area 106 (step S122).

In the spot AE control at S108, the object area (second area) of the spot AE control is made the area in the tapped AF frame 107, so that the exposure adjustment can be performed with reference to the point desired by the user. However, no limitation is made to the example, and the object area of the spot AE control may be set to an arbitrary area such as, for example, the focused area 107 as long as the area includes the position specified by the user's tap and is the predetermined second area narrower than the multi AF area 104 (first area).

On the other hand, when a tap is not performed on any AF frame 107 in the focused area 106, that is, when a tap is performed at a position outside the focused area 106, advance is made to step S112, the CPU 23 performs the multi AE control with reference to, for example, the whole screen 100 (third area) (step S112), and performs the photographing and recording process (step S122). Incidentally, in the multi AE control, the priority exposure control may be performed on the focused area 106, not the whole screen 100. That is, the object area (third area) of the multi AE control is not limited to the example of the whole screen 100, and may be an arbitrary area such as the focused area 106 as long as the area is the third area wider than the second area as the object of the spot AE control (S110).

When the AF lock state does not occur at step S106, at step S114, the CPU 23 determines whether the user continues to tap an arbitrary position on the screen 100 of the touch panel 16 for a predetermined time or more (step S114). When the tap is continued for the predetermined time or more, the user has an intention to photograph a fine image while focus is achieved on the specified position. Then, the CPU 23 performs the spot AF control and the spot AE control on a predetermined fourth area including the tap position (step S116), and then performs the photographing and recording process (step S126). Incidentally, the fourth area may be set to an arbitrary area as long as the area includes the position specified by the user's tap and is narrower than the multi AF area 104 at S102. By this, the image obtained by performing focusing and exposure adjustment on the region at and around the position which the user continues to tap can be forcibly recorded.

On the other hand, at step S114, when the user does not tap for the predetermined time or more, although this is generally neglected, advance is made to step S118 in this embodiment, and the CPU 23 checks whether the user again taps within the predetermined time (step S118). That is, at step S118, when contact is made with the contact sensor 60 and the AF is not determined, the CPU 23 checks whether the user performs a double-tap on the touch panel 16 within the predetermined time. When there is no double-tap, return is made to step S100.

On the other hand, when it is determined at step S118 that the double-tap is performed, advance is made to step S120, and after the multi AF control and the multi AE control are performed for a predetermined fifth area (for example, the whole screen 100) including at least the multi AF area 104 (first area) (step S120), the photographing and recording process is performed (step S122). By this, even in the case where focus is not achieved in the multi AF control while the multi AF area 104 (see FIG. 12) at S102 is made the object, the multi AF control is performed while the whole screen 100 wider than that is made the object, and photographing can be executed. Incidentally, the fifth area as the object of the multi AF/AE control is not limited to the example of the whole screen 100, and may be, for example, the multi AF area 104 of FIG. 12 as long as the area is wider than the spot AF area 103. By this, the multi AF control and the priority exposure control are performed for the multi AF area 104, and the image obtained after focusing and exposure are adjusted in the range wider than the spot AF area can be recorded.

Up to here, the imaging method of the third embodiment has been described with reference to FIG. 11. The imaging method is the method in which after the contact sensor 60 is touched, the touch panel 16 is touched. That the user first touches the contact sensor 60 is interpreted to mean that the AF process may be left to the imaging apparatus 10, and there is a high intention to quickly perform photographing before composition and focus position are determined. The imaging method in FIG. 11 takes such an intention into consideration. That is, when the contact sensor 60 is first touched, the imaging apparatus 10 tries to perform the multi AF with reference to the center of the screen 100. This is the same as a half-depressed state of a shutter button of a general imaging apparatus.

(1) While the imaging apparatus 10 is successful in focusing on an arbitrary subject on the screen 100 (AF lock state), the plural AF frames 107 representing the focused area are displayed. When an arbitrary position on the screen 100 is touched during this, photographing is started. Further, when either one of the plural AF frames 107 representing the focused area is tapped, the spot AE is performed only on the area in the AF frame 107 (S110). Incidentally, at this time point, since focus is already achieved, it is not necessary to newly perform focusing. On the other hand, when an arbitrary position other than the AF frames 107 representing the focused area is touched, the multi AE process is performed and photographing is performed (S112).

The merits of the above operation will be described. First, it is not necessary to perform deep depression of a shutter button as the operation of starting photographing, and the screen 100 has only to be lightly touched, and therefore, photographing can be performed without hand movement. Besides, the AE area narrower than the multi AF area can be specified by the specifying method of the tap position after the AF lock state. That is, there is a merit that the AF area and the AE area can be separately specified. Besides, the AF frame 107 in the screen 100 is displayed and the information indicating whether focusing is achieved on the subject (for example, color change of the AF frame 107) is displayed, so that the user can recognize the focusing position and the achievement or non-achievement of focusing.

(2) Besides, when focusing is not achieved on an arbitrary subject on the screen 100, since the plural AF frames 107 indicating the focusing are not displayed, the user can know that focusing is not achieved on the subject. At this time, when the touch panel 16 is tapped and is immediately released, photographing is not performed, and therefore, a miss-touch can be prevented. However, when the tap is continued at an arbitrary position of the touch panel 16 for the predetermined time or more, it is regarded that the user desires to take a photograph while focus is achieved on the tap position, and the photographing is performed after the spot AE/AF (S116) is performed on the specified area. Further, there is also a case where photographing is desired to be immediately performed even if the AF is not performed. In this case, even if the focusing is not achieved on the subject, when a double-tap (S118) is performed at an arbitrary position on the screen 100, the photographing can be immediately started. At this time, even if the imaging apparatus 10 is in the middle of the automatic focusing operation, the photographing is performed.

Figure 14:
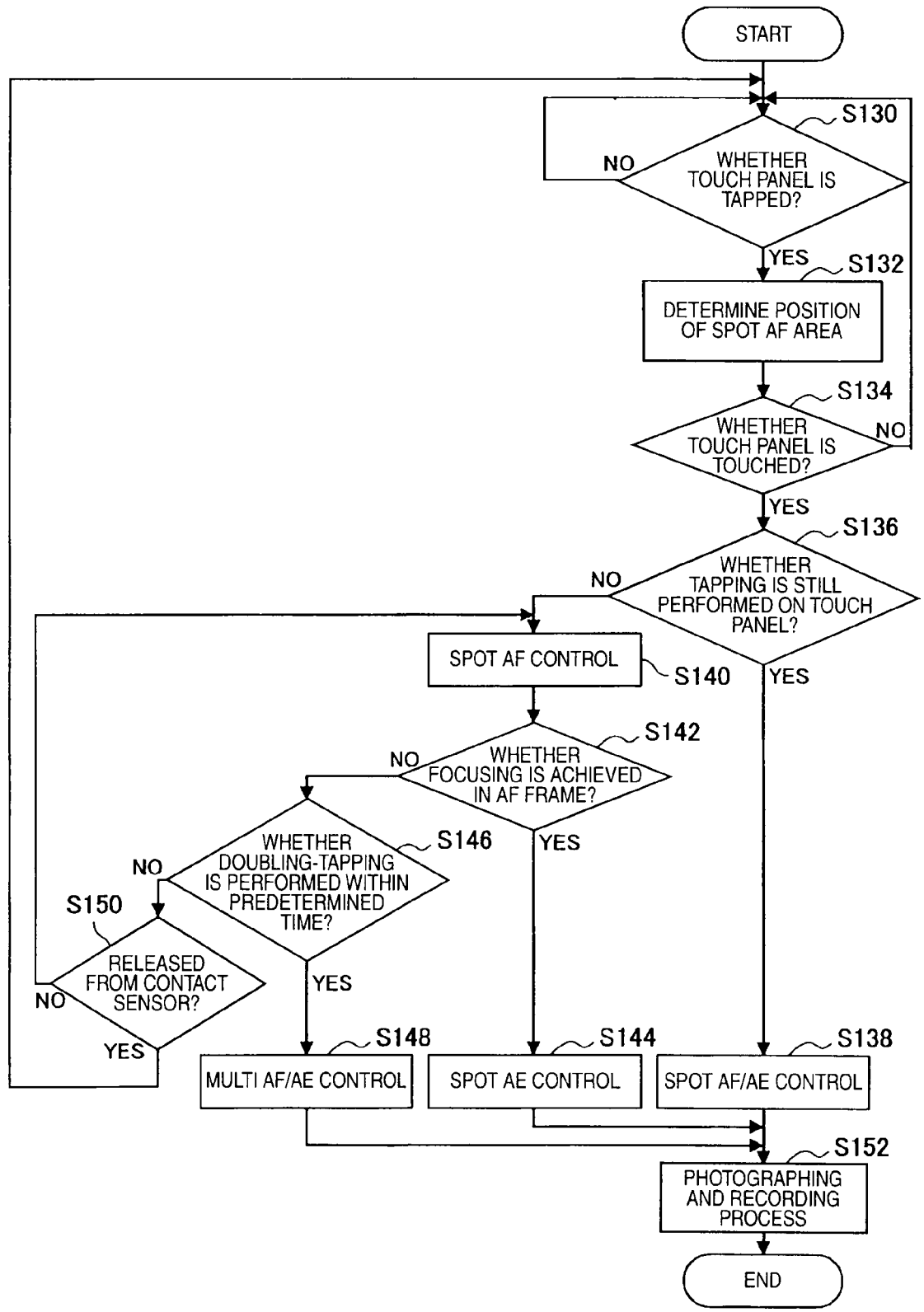
FIG. 14 is a flowchart showing a modified example of the imaging method of the imaging apparatus of the embodiment.

Next, a modified example of the imaging method of the third embodiment of the invention will be described in detail with reference to FIG. 14. FIG. 14 is a flowchart showing the modified example of the imaging method of the imaging apparatus 10 of the embodiment. The imaging method is a method in which the user taps the touch panel 16 and then touches the contact sensor 60 of the operation unit 24, so that the imaging apparatus 10 performs the photographing and recording process.

Figure 15:
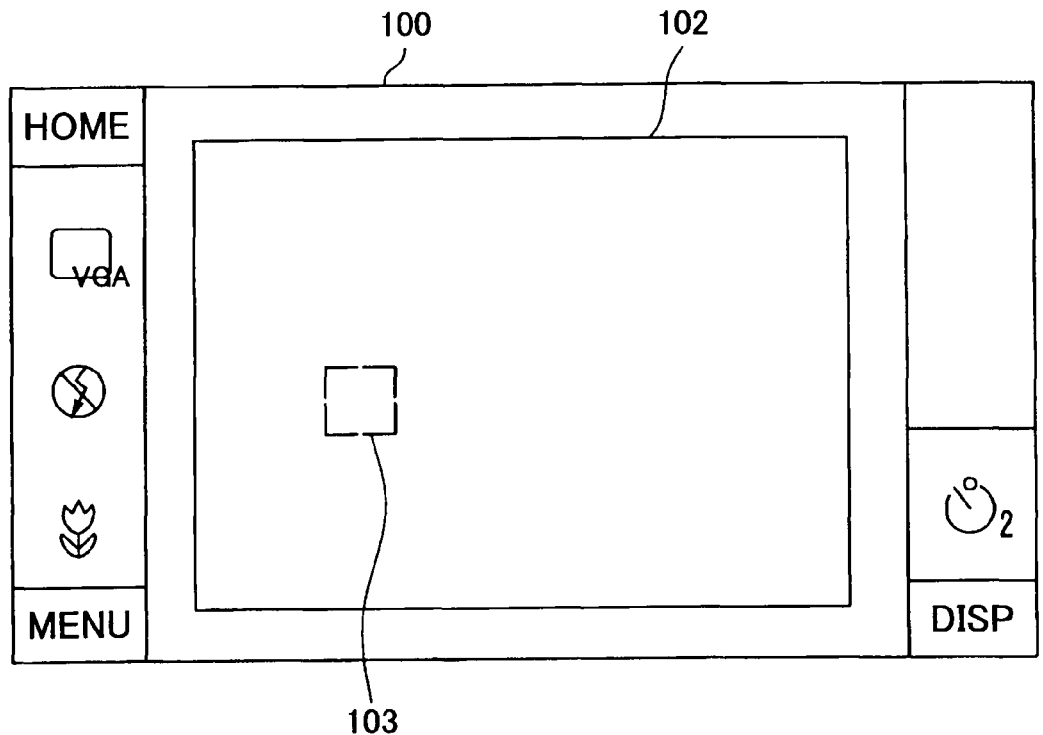
FIG. 15 is a display screen example showing a spot AF frame of the embodiment.

As shown in FIG. 14, first, at step S130, the CPU 23 typically checks whether the user taps the touch panel 16 (step S130). When there is no tap, the process is repeated until a tap is performed. When there is a tap at an arbitrary position of the touch panel 16, the CPU 23 sets a spot AF area at the position specified by the tap (step S132). As shown in FIG. 15, the CPU 23 causes the liquid crystal panel 17 to display a spot AF frame 103 representing the spot AF area.

Here, an AF detectable frame 102 shown in FIG. 15 is a frame line indicating an AF detection range. When the user taps the touch panel and specifies the position of the spot AF area, the position can be specified only in the range indicated by the AF detectable frame 102. When a tap is performed at a position outside the AF detectable frame 102, the setting of the spot AF area and the display of the spot AF frame 103 are not performed. When the tap position is in the AF detectable frame 102, the spot AF frame 103 as shown in FIG. 15 is displayed, and accordingly, the user can confirm whether the specified position is a desired position.

After the position of the spot AF area is specified, at step S134, the CPU 23 checks whether the user touches the contact sensor 60 (step 134). When the user does not touch the contact sensor 60, since a photographing instruction is not made, return is made to step 130. When the user touches the sensor, advance is made to next step S136.

Next, at step 236, the CPU 23 checks whether the user continues to tap the touch panel 16 (step S136). When the user touches the contact sensor 60 at S134 while continuing to tap the touch panel 16 from S130, since the user has an intention to adjust focus and exposure on the tap position, the spot AE control and the spot AF control are performed on the tap position at step 138 (step S138), and then, the photographing and recording process is performed (step 152).

On the other hand, at step 136, when it is determined that the user does not continue to tap the touch panel 16 but stops tapping, advance is made to step S140, and the CPU 23 tries to perform the spot AF control on the specified spot AF area (step 140).

Next, when the CPU 23 succeeds in the automatic focusing on the specified AF area (step 142), the CPU performs the spot AE control on the spot AF area (step 144), and then performs the photographing and recording process (step 152). Incidentally, when the automatic focusing is successful, the display of the spot AF frame 103 of FIG. 15 is changed from, for example, white at the non-focused time to green at the focused time, and the focused state or non-focused state is notified to the user. Incidentally, the display method of the spot AF frame 103 is not limited to the example, and any mode may be adopted as long as the focused state and the non-focused state can be differentiated. For example, a display method may be such that the AF frame is blinked at the non-focused time, and the blinking of the AF frame is stopped at the focused time and normal display is performed.

Figure 16:
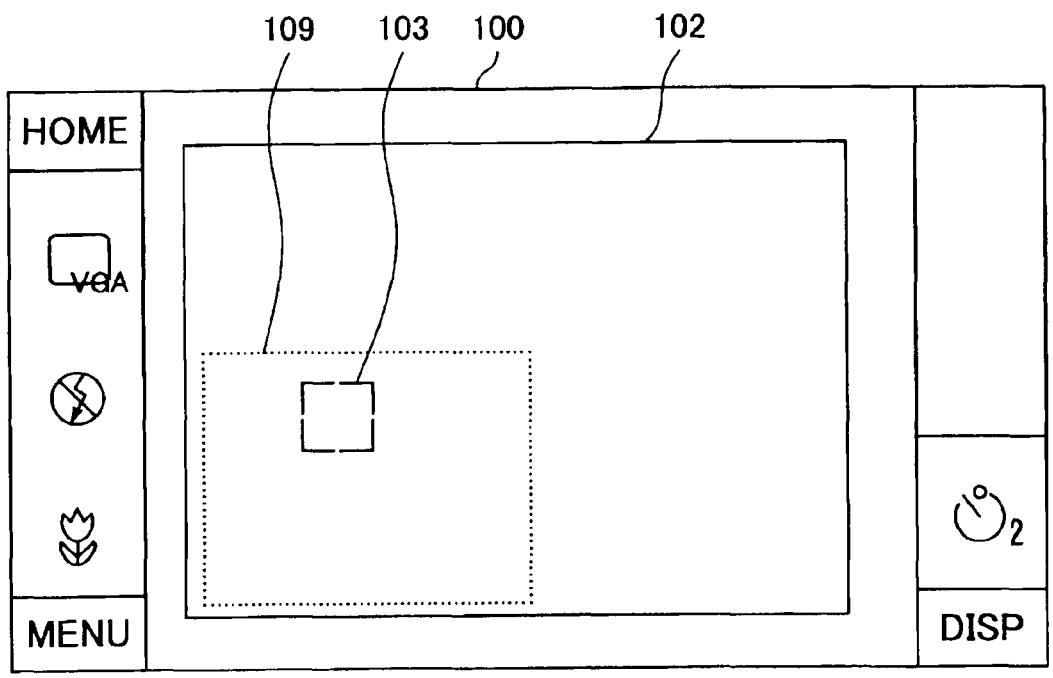
FIG. 16 is a display screen example showing an object area of multi AF control of the embodiment.

On the other hand, at step 142, when the automatic focusing is not successful, at next step S146, the CPU 23 checks whether the user continuously taps an arbitrary position of the touch panel 16 two times (that is, double-tapping) (step S146). When the user performs double-tapping, since the intention is to immediately take a photograph, the multi AE and the multi AF are performed on the whole screen 100 (step S148), and then the photographing and recording process is performed (step 152). Incidentally, the object of the multi AF/AE is not limited to the example of the whole screen 100. For example, as shown in FIG. 16, among four divided areas obtained by dividing the AF detectable frame 102 into four equal parts, the multi AF and the priority exposure control may be performed on the divided area 109 including the specified spot AF frame 103.

Besides, when the user does not perform double-tapping at step 146, advance is made to step S150, and the CPU 23 checks whether the user separates the finger from the contact sensor 60 (step 150). When the hand is separated from the contact sensor 60, return is made to step 130. On the other hand, when the hand continues to touch the contact sensor 60, return is made to step 140, and the automatic focusing control to the specified spot AF frame 103 is continued.

Up to here, the imaging method of the modified example of the third embodiment has been described with reference to FIG. 14. The imaging method is the method in which after the touch panel 16 is touched, the contact sensor 60 is touched. From the fact that the user first touches the touch panel 16, it is assumed that the user has an intention to first specify the position of the spot AF in the screen 100, and to take a photograph after composing and framing of the screen 100 are performed.

(1) Then, first, when the user touches the contact sensor 60 while tapping an arbitrary position on the touch panel 16, the user intends to immediately perform photographing after focus is achieved on the subject at the specified position. Then, the spot AE/AF control (S138) is performed on the specified position to the utmost degree, and the photographing is performed.

(2) Besides, when tapping is performed at an arbitrary position of the touch panel 16 and is released, the spot AF frame 103 is displayed at the specified position on the screen 100. Thereafter, the user touches the contact sensor 60 at an arbitrary time point, and while the user continues to touch the contact button 60, the imaging apparatus 10 performs the AF control (S140) on the subject in the AF frame 103. Thereafter, photographing is performed at the time point when focus is achieved on the subject in the AF frame 103. Of course, with respect to the exposure control, the spot AE control (S144) is performed on the area in the spot AF frame.

(3) However, from the performance of a camera, there is also a case where focus is not easily achieved on the subject in the specified AF frame 103. In this case, it is notified by blinking or the like of the AF frame 103 to the user that focus is not achieved. When photographing is desired to be immediately performed at this time point, an arbitrary position on the screen 100 is double-tapped (S146), so that photographing can be performed even during the focusing operation. With respect to the exposure control in this case, since importance is given to the area once specified by the user, the multi AE control is performed on the wider area 109 including the specified spot AF frame 103.

Up to here, the imaging apparatus 10 and the imaging method of the third embodiment have been described with reference to FIG. 11 to FIG. 19B, however, the invention is not limited to the example, and various improvements and modifications can be made within the scope not departing from the gist.

For example, in the above, in addition to the touch panel 16, the contact sensor 60 is used as the input detection unit to detect the user input. However, no limitation is made to the example. The input detection unit may be arbitrary means as long as the user input can be detected, and may be an optical sensor to optically detect an object, or various operation tools such as, for example, the shutter button 35, a normal button, a lever, a switch, or a dial.

Figure 17A:
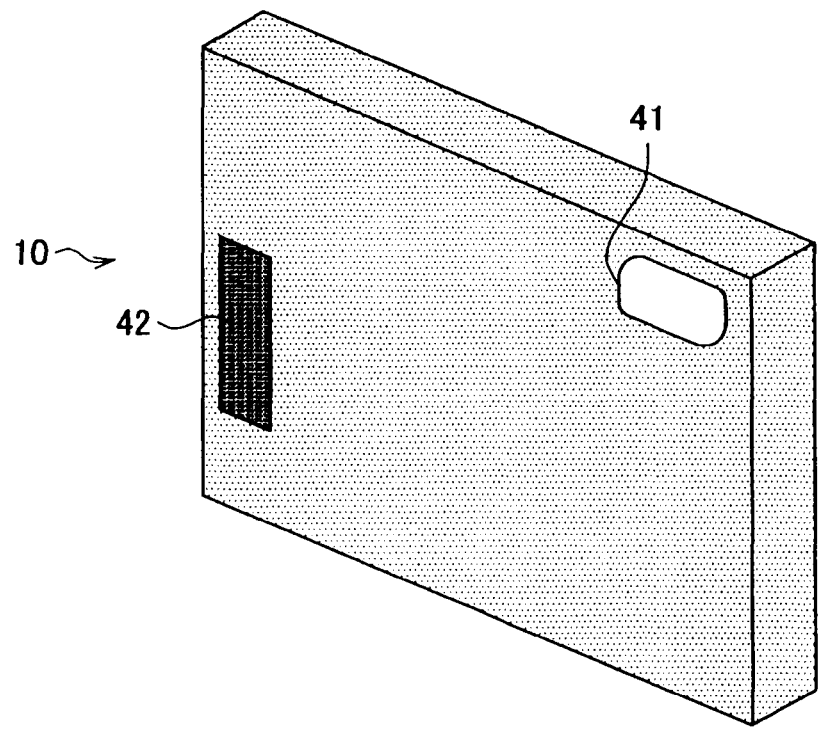
FIG. 17A is a front perspective view showing a modified example of the imaging apparatus of the embodiment.
Figure 17B:
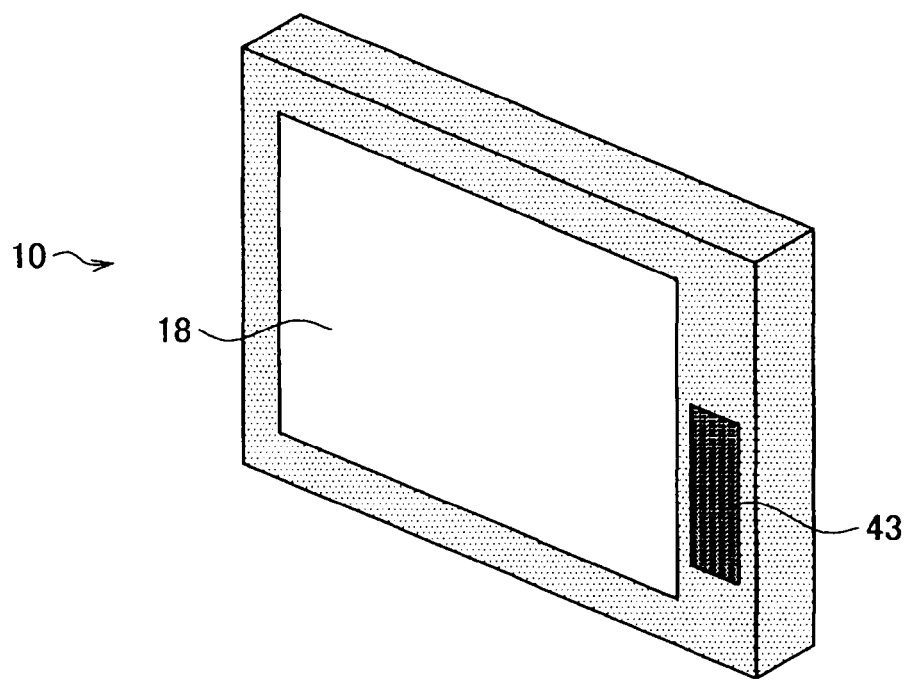
FIG. 17B is a rear perspective view showing the modified example of the imaging apparatus of the embodiment.
Figure 18:
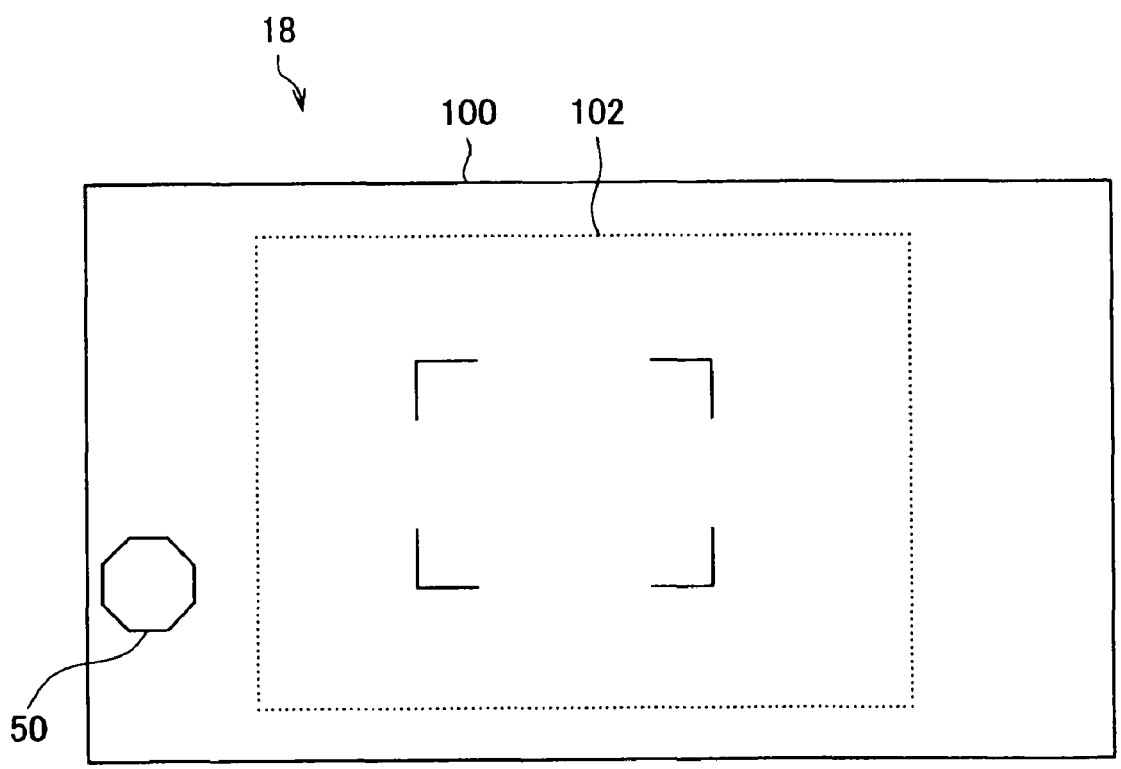
FIG. 18 is a display screen example showing a GUI part as an input detection unit of the embodiment.

Also with respect to the placement position of the input detection unit in the imaging apparatus 10, no limitation is made to the example where it is disposed on the upper surface of the imaging apparatus 10 like the contact sensor 60. For example, as shown in FIG. 17A, as an input detection unit 42, a contact sensor or an optical sensor may be placed on the front of the imaging apparatus 10, that is, on the surface at the side where an imaging lens 41 is disposed. Besides, as shown in FIG. 17B, as an input detection unit 43, a contact sensor or an optical sensor may be placed on the back of the imaging apparatus 10, that is, on the surface at the side where the touch panel 18 is disposed. In addition to these, in view of the operability of the user, the input detection unit may be placed at an appropriate place of an arbitrary surface of the imaging apparatus 10.

Further, as the input detection unit, instead of providing a physical sensor, an operation tool or the like, a GUI part in which an equivalent function is mounted may be provided on the touch panel 16. For example, as in an example shown in FIG. 18, on the screen 100 of the touch screen 18, the GUI part 50 is disposed in an area outside the AF detectable frame 102 representing the AF detection range, and the GUI part 50 may be made to function as the input detection unit. That is, a state where the user taps the GUI part 50 of the touch panel 16 is equivalent to a state where input is detected by the contact sensor 60 or the like, and a state where the GUI part 50 is not tapped is equivalent to a state where input is not detected by the contact sensor 60 or the like. Incidentally, the arrangement of the GUI part 50 is not limited to the example of FIG. 18, and may be an arbitrary position on the touch screen 18 as long as the position does not cause any problem in the operation of the user.

Figure 19A:
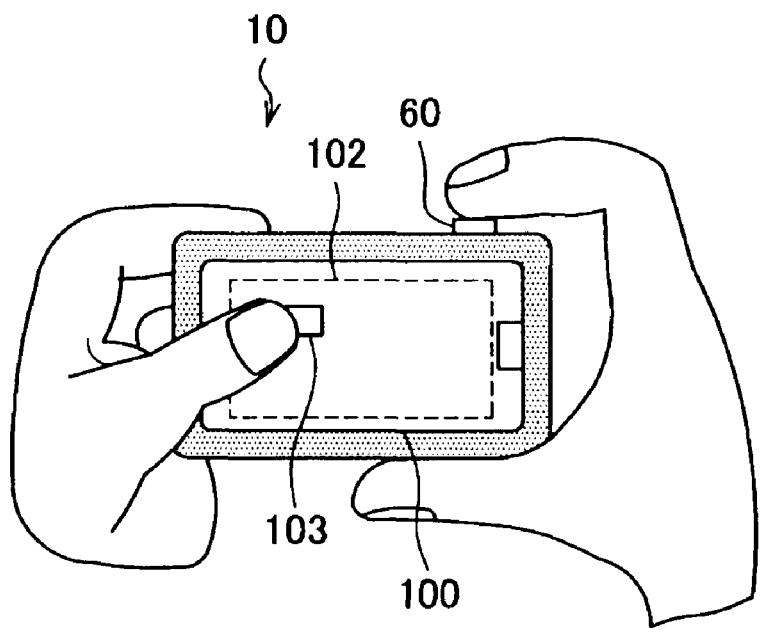
FIG. 19A is an explanatory view showing a use state of the imaging apparatus of the embodiment.
Figure 19B:
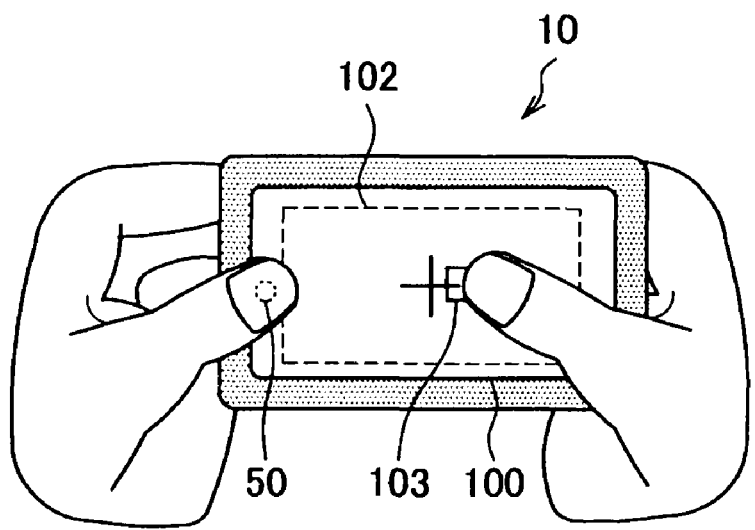
FIG. 19B is an explanatory view showing a use state of the imaging apparatus of the embodiment.

Here, the operation and the carrying method of the imaging apparatus 10 of the embodiment will be described with reference to FIGS. 19A and 19B. FIGS. 19A and 19B are explanatory views showing use states of the imaging apparatus 10.

In the example shown in FIG. 19A, the operation method is shown in which a contact sensor 60 as the input detection unit is placed on the upper surface of the imaging apparatus 10. As shown in FIG. 19A, the user holds the imaging apparatus 10 by both hands, taps an arbitrary position on the touch screen 18 by the left thumb, and can specify the position of the spot AF frame 103 or the like, and can touch the contact sensor 60 by the right index finger.

Besides, in the example shown in FIG. 19B, instead of placing the physical input detection unit on the outer casing of the imaging apparatus 10, the GUI part 50 provided on the touch screen 18 is used as the input detection unit. Here, the user holds the imaging apparatus 10 by both hands, taps the GUI part 50 disposed at a predetermined position of the touch screen 18 by the left thumb, and can tap an arbitrary position on the touch screen 18 by the right thumb.

As shown in FIGS. 19A and 19B, the user can hold the imaging apparatus 10 by both hands. Besides, photographing can be performed by the operation of lightly tapping or touching the input detection unit (contact sensor 60, GUI part 50, etc.) or the touch screen 18, not by the operation of depressing the shutter button 35 as in the related art. Accordingly, the user can stably hold the imaging apparatus 10 by both hands, and an excessive force is not applied to the imaging apparatus 10 at the time of photographing, and therefore, there is a merit that hand movement hardly occurs. Besides, since photographing can be performed by the simply tap operation of the thumbs of both hands, the operation can be intuitively performed and is highly convenient.

Up to here, the imaging apparatus 10 and the imaging method of the third embodiment have been described. In the related art imaging apparatus (for example, digital camera), the shutter button is half depressed to perform the focusing operation, and then, is full depression to take a photograph. Thus, when the shutter button is depressed, the hand movement is likely to occur. On the other hand, in the imaging apparatus 10 of the embodiment, instead of the shutter button, the input detection unit such as, for example, the contact sensor 60 or the GUI part 50 is provided, and photographing is performed by the operation system of the combination of the input detection unit and the touch panel 16. By this, since the user has only to lightly touch the touch panel 16 or the input detection unit of the imaging apparatus 10, that is, has only to tap it, the hand movement at the time of photographing can be prevented.

Besides, a further merit is that by adopting the operation system of the combination of the input detection unit and the touch panel 16, the flow of the operation up to the photographing can be smoothly executed while finely specifying the AE/AF point by the more intuitive and less trouble method. Further, as shown in FIG. 11 and FIG. 14, since the process flow optimized for the imaging procedure is performed, the efficiency of the inner process is high.

Besides, by using the GUI part 50 or the like as the input detection unit, it is not necessary to provide buttons and sensors on the outside of the main body of the imaging apparatus 10, and they can be replaced by the touch panel 16. Thus, the number of parts can be decreased and the manufacturing cost can be reduced. Besides, the user holds the imaging apparatus 10 in an arbitrary direction and can take a photograph.

As described above, according to the embodiment, in the imaging apparatus 10 including the touch panel 16, when a still image is taken and recorded at a desired timing while seeing a live view image displayed on the imaging apparatus 10, the operation system which is intuitive, has few operation errors due to the personal sense, and has high convenience can be provided.

Up to here, although the embodiments of the invention have been described with reference to the accompanying drawings, it would be apparent for those skilled in the technical field to which the invention belongs that various modified examples or corrected examples are conceivable within the scope of the technical idea recited in the claims, and it would be understood that these fall within the technical scope of the invention.

For example, in the embodiment, although the digital still camera for picking up a still image is mainly described as the imaging apparatus, the invention is not limited to the example. For example, the invention can be applied also to a digital video camera, a monitor camera for performing fixed-point observation, or various electronic equipments (cellular phone, etc.) including imaging units.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus comprising:
   an imaging unit to pick up an image of a subject;
   a focusing unit to perform focusing on the subject included in an autofocus area in an imaging range of the imaging unit;
   a display unit to display an image obtained by picking up an image of the subject by the imaging unit;
   a display control unit to control the display unit to display an autofocus frame representing the autofocus area on the image;
   a position specification reception unit that is disposed to be superimposed on the display unit and receives user's position specification to the image displayed on the display unit;
   a record control unit to record the image on a recording medium in a state where focusing is achieved on the subject included in the autofocus area when the position specification reception unit receives the position specification in the autofocus frame displayed on the display unit; and
   an autofocus area setting unit to set the autofocus area in the imaging range, wherein
   the position specification reception unit receives position specification of the autofocus area in the imaging range by a first tap of the user on the position specification reception unit,
   the autofocus area setting unit sets the autofocus area at a position specified by the user's first tap on the position specification reception unit,
   the position specification reception unit receives the user's position specification to the image displayed on the display unit by a second tap of the user, with respect to the first tap of the user, on the position specification reception unit, and when a focusing process on the subject included in the autofocus area by the focusing unit is completed and a position specified by the second tap is in the autofocus frame displayed on the display unit, the record control unit records, on the recording medium, the image focused on the subject included in the autofocus area.

2. The imaging apparatus according to claim 1, wherein when the position specified by the second tap is outside the autofocus frame displayed on the display unit, the autofocus area setting unit moves the autofocus area to the position specified by the second tap.

3. The imaging apparatus according to claim 1, wherein when the focusing process is not completed and the second tap is received within a predetermined time from the first tap, the record control unit records the image on the recording medium.

4. The imaging apparatus according to claim 3, wherein when the focusing process is not completed, the second tap is received within the predetermined time from the first tap and the position specified by the second tap is in a first area containing the autofocus frame, the record control unit records the image on the recording medium.

5. The imaging apparatus according to claim 3, wherein when the focusing process is not completed and the second tap is received within the predetermined time from the first tap, the autofocus area setting unit sets a second area containing the autofocus area as a new autofocus area, and the focusing unit performs the focusing process on the subject included in the second area, and the record control unit records, on the recording medium, the image focused on the subject included in the second area.

6. The imaging apparatus according to claim 1, wherein when the focusing process is not completed and the position specification by the second tap is outside a first area containing the autofocus frame or the second tap is received after a predetermined time passes from the first tap, the autofocus area setting unit moves the autofocus area to the position specified by the second tap.

7. The imaging apparatus according to claim 1, wherein the focusing unit starts the focusing process on the subject included in the autofocus area in response to the first tap.

8. The imaging apparatus according to claim 1, wherein the focusing unit continues the focusing process on the subject included in the autofocus area while the first tap on the position specification reception unit is continued.

9. The imaging apparatus according to claim 1, wherein the autofocus area setting unit returns the autofocus area set at the position specified by the first tap on the position specification reception unit to an initial state according to an input operation of the user to the imaging apparatus.

10. The imaging apparatus according to claim 1, wherein the display control unit controls the display unit to superimpose, on the image, at least one of information indicating whether a focusing process on the subject included in the autofocus area by the focusing unit is completed and information indicating an area where the autofocus area can be specified.

11. The imaging apparatus according to claim 1, further comprising an exposure adjusting unit to perform exposure adjustment on the image while an autoexposure area in the imaging range is made an object, wherein when the position specified by the second tap is in the autofocus frame displayed on the display unit, the exposure adjusting unit performs exposure adjustment on the image while a second area including the position specified by the second tap and narrower than a first area corresponding to the auto focus area is made the autoexposure area, when the position specified by the second tap is outside the autofocus frame displayed on the display unit, the exposure adjusting unit performs exposure adjustment on the image while a third area wider than at least the second area is made the autoexposure area, and the record control unit records, on the recording medium, the image focused on the subject included in the autofocus area and subjected to the exposure adjustment while the second area or the third area is made the object.

12. The imaging apparatus according to claim 1, further comprising an exposure adjusting unit to perform exposure adjustment on the image while an autoexposure area in the imaging range is made an object, wherein when the focusing process is not completed and the first tap on the position specification reception unit continues for at least a predetermined time, the focusing unit performs focusing on the subject included in a second area which includes the position specified by the first tap and is narrower than a first area corresponding to the auto focus area, the exposure adjusting unit performs exposure adjustment on the image while the second area is made an object, and the record control unit records, on the recording medium, the image focused on the subject included in the second area and subjected to the exposure adjustment while the second area is made the object.

13. The imaging apparatus according to claim 1, further comprising an exposure adjusting unit to perform exposure adjustment on the image while an autoexposure area in the imaging range is made an object, and an autoexposure area setting unit to set the autoexposure area to be positioned at a center of the autofocus area set at an arbitrary position in the imaging range.

14. The imaging apparatus according to claim 1, further comprising a signal processing unit to perform a signal process on the image obtained by picking up an image of the subject by the imaging unit, wherein when the position specification reception unit receives the position specification in the autofocus frame displayed on the display unit, the signal processing unit performs the signal process on the image in a state where focusing is achieved on the subject included in the autofocus area, and the record control unit records the image after the signal process on the recording medium.

15. An imaging method comprising the steps of:
displaying, on a display unit, an image obtained by picking up an image of a subject by an imaging unit;
displaying, on the image displayed on the display unit, an autofocus frame representing an autofocus area in an imaging range of the image pick up unit;
receiving position specification in the autofocus frame displayed on the display unit by a position specification reception unit that is disposed to be superimposed on the display unit and receives user's position specification to the image displayed on the display unit;
setting the autofocus area in the imaging range;
receiving position specification of the autofocus area in the imaging range by a first tap of the user on the position specification reception unit,
setting the autofocus area at a position specified by the user's first tap on the position specification reception unit;
receiving the user's position specification to the image displayed on the display unit by a second tap of the user, with respect to the first tap of the user, on the position specification reception unit; and when a focusing process on the subject included in the autofocus area is completed and a position specified by the second tap is in the autofocus frame displayed on the display unit, recording, on a recording medium, the image focused on the subject included in the autofocus area.

16. A non-transitory computer readable storage medium encoded with instructions, which when executed by a computer causes the computer to implement a method comprising:

displaying, on a display unit, an image obtained by picking up an image of a subject by an imaging unit;

displaying, on the image displayed on the display unit, an autofocus frame representing an autofocus area in an imaging range of the image pick up unit;

receiving position specification in the autofocus frame displayed on the display unit by a position specification reception unit that is disposed to be superimposed on the display unit and receives user's position specification to the image displayed on the display unit;

setting the autofocus area in the imaging range;

receiving position specification of the autofocus area in the imaging range by a first tap of the user on the position specification reception unit, setting the autofocus area at a position specified by the user's first tap on the position specification reception unit;

receiving the user's position specification to the image displayed on the display unit by a second tap of the user, with respect to the first tap of the user, on the position specification reception unit; and when a focusing process on the subject included in the autofocus area is completed and a position specified by the second tap is in the autofocus frame displayed on the display unit, recording, on a recording medium, the image focused on the subject included in the autofocus area.

* * * * *